US009605115B2

(12) United States Patent
Garois et al.

(10) Patent No.: US 9,605,115 B2
(45) Date of Patent: Mar. 28, 2017

(54) PROCESS FOR PREPARING A REINFORCED AND REACTIVE THERMOPLASTIC COMPOSITION, AND THIS COMPOSITION

(71) Applicant: Hutchinson, Paris (FR)

(72) Inventors: Nicolas Garois, Amilly (FR); Philippe Sonntag, Hericy (FR); Gregory Martin, Villemandeur (FR); Matthieu Vatan, Puiseaux (FR); Jacques Drouvroy, Montargis (FR)

(73) Assignee: Hutchinson, Paris (FR)

( * ) Notice: Subject to any disclaimer, the term of this patent is extended or adjusted under 35 U.S.C. 154(b) by 33 days.

(21) Appl. No.: 14/245,065

(22) Filed: Apr. 4, 2014

(65) Prior Publication Data
US 2015/0025197 A1    Jan. 22, 2015

Related U.S. Application Data

(62) Division of application No. 13/196,500, filed on Aug. 2, 2011, now Pat. No. 8,784,711.

(30) Foreign Application Priority Data

Aug. 4, 2010   (FR) ..................................... 10 03268

(51) Int. Cl.
| | |
|---|---|
| C08L 23/06 | (2006.01) |
| C08L 23/08 | (2006.01) |
| C08L 23/12 | (2006.01) |
| C08L 23/16 | (2006.01) |
| C08L 25/06 | (2006.01) |
| C08L 67/00 | (2006.01) |
| C08L 71/00 | (2006.01) |
| C08L 75/04 | (2006.01) |
| C08L 79/08 | (2006.01) |
| C08L 81/06 | (2006.01) |
| C08J 3/24 | (2006.01) |
| C08G 69/40 | (2006.01) |
| C08L 77/00 | (2006.01) |
| C08L 77/02 | (2006.01) |
| C08L 97/02 | (2006.01) |
| C08G 77/12 | (2006.01) |
| C08K 5/00 | (2006.01) |
| C08L 63/00 | (2006.01) |
| C08L 83/04 | (2006.01) |

(52) U.S. Cl.
CPC ................ *C08J 3/24* (2013.01); *C08G 69/40* (2013.01); *C08L 23/06* (2013.01); *C08L 23/12* (2013.01); *C08L 23/16* (2013.01); *C08L 67/00* (2013.01); *C08L 75/04* (2013.01); *C08L 77/00* (2013.01); *C08L 77/02* (2013.01); *C08L 79/08* (2013.01); *C08L 81/06* (2013.01); *C08L 97/02* (2013.01); *C08G 77/12* (2013.01); *C08J 2323/06* (2013.01); *C08J 2367/00* (2013.01); *C08J 2375/04* (2013.01); *C08J 2377/02* (2013.01); *C08J 2377/06* (2013.01); *C08J 2451/06* (2013.01); *C08J 2463/00* (2013.01); *C08J 2483/04* (2013.01); *C08K 5/0025* (2013.01); *C08L 63/00* (2013.01); *C08L 83/04* (2013.01); *C08L 2205/16* (2013.01)

(58) Field of Classification Search
None
See application file for complete search history.

(56) References Cited

U.S. PATENT DOCUMENTS

| | | | |
|---|---|---|---|
| 4,975,207 | A | 12/1990 | Lee |
| 5,364,905 | A | 11/1994 | Bauer et al. |
| 5,709,948 | A | 1/1998 | Perez et al. |
| 6,197,898 | B1 | 3/2001 | van den Berg et al. |

(Continued)

FOREIGN PATENT DOCUMENTS

| | | |
|---|---|---|
| EP | 0 529 799 A1 | 3/1993 |
| JP | 2008-111062 A | 5/2008 |

(Continued)

OTHER PUBLICATIONS

Meynie et al. "Limitation of the Coalescence of Evolutive Droplets by the Use of Copolymers in a Thermoplastic/Thermoset Blend," Macromolecular Materials and Engineering, vol. 290, 2005, pp. 906-911.*

Jiang, X., et al.; "Dynamically Cured Polypropylene/Epoxy Blends"; Journal of Applied Polymer Science; vol. 92; Issue 3; May 2004; pp. 1437-1448.

Meynie, L., et al.; "Limitation of the Coalescence of Evolutive Droplets by the Use of Copolymers in a Thermoplastic/Thermoset Blend"; Journal of Macromolecular Materials and Engineering; vol. 290; Issue 9; Sep. 2005; pp. 906-911.

(Continued)

*Primary Examiner* — Robert Sellers
(74) *Attorney, Agent, or Firm* — Alston & Bird LLP

(57) ABSTRACT

A process for preparing a reinforced and reactive thermoplastic composition having a continuous phase based on a thermoplastic polymer and dispersed therein is a discontinuous phase based on a reactive reinforcing agent that may be immiscible with the thermoplastic polymer is provided. A composition obtained by this process is also provided. The reinforcing agent is selected from the group consisting of epoxy resins, polyorganosiloxanes having SiH functional group(s), diisocyanates or polyisocyanates and mixtures thereof, comprises a grafting, a branching and/or a crosslinking, that are carried out in situ, by reactive compounding of these phases with a shear rate greater than $10^2$ s$^{-1}$, of the reinforcing agent onto the chain of the thermoplastic polymer, so that the discontinuous phase is dispersed homogeneously in the continuous phase in the form of nodules having a number-average size of less than 5 µm.

5 Claims, 19 Drawing Sheets

(56) References Cited

U.S. PATENT DOCUMENTS

| | | | | |
|---|---|---|---|---|
| 6,607,825 B1 * | 8/2003 | Wang | ................ | B32B 7/12 |
| | | | | 174/259 |
| 8,648,145 B2 | 2/2014 | Garois et al. | | |
| 2004/0260023 A1 | 12/2004 | Park et al. | | |
| 2005/0277737 A1 | 12/2005 | Yamauchi et al. | | |
| 2011/0281984 A1 | 11/2011 | Garois et al. | | |

FOREIGN PATENT DOCUMENTS

| | | |
|---|---|---|
| WO | WO 2007/001609 A1 | 1/2007 |
| WO | WO 2009/072677 A1 | 6/2009 |

OTHER PUBLICATIONS

Meynié, L.; "Evolution et contrôle de la morphologie d'un melange thermoplastique/thermodurcissable polymerisé sous cisaillement" [Evolution and control of the morphology of a thermoplastic/thermosetting mixture polymerized under shear]; defended on Jun. 9, 2003 before the Institut National des Sciences Appliquées in Lyons.

Search Report for French Application No. FR 10 03268, dated Feb. 25, 2011.

Extended European Search Report from corresponding European Patent Application No. 11174521.2 dated Nov. 21, 2011.

Communication from corresponding European Patent Application No. 11174521.2 dated Mar. 6, 2015.

Communication from corresponding European Patent Application No. 11174521.2 dated Dec. 14, 2012.

* cited by examiner

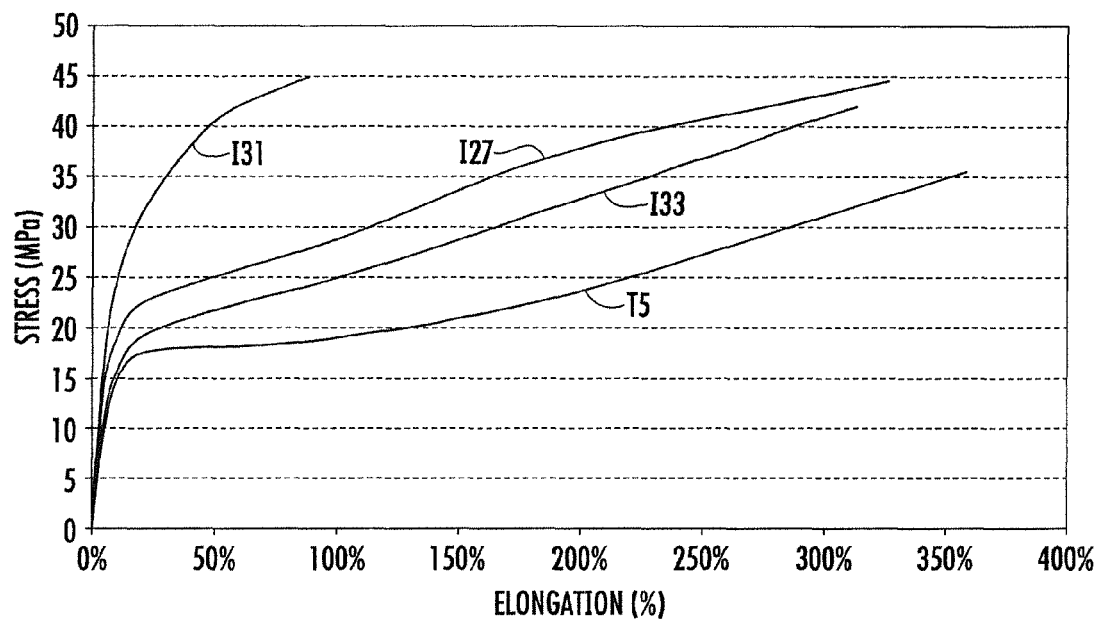
FIG. 11
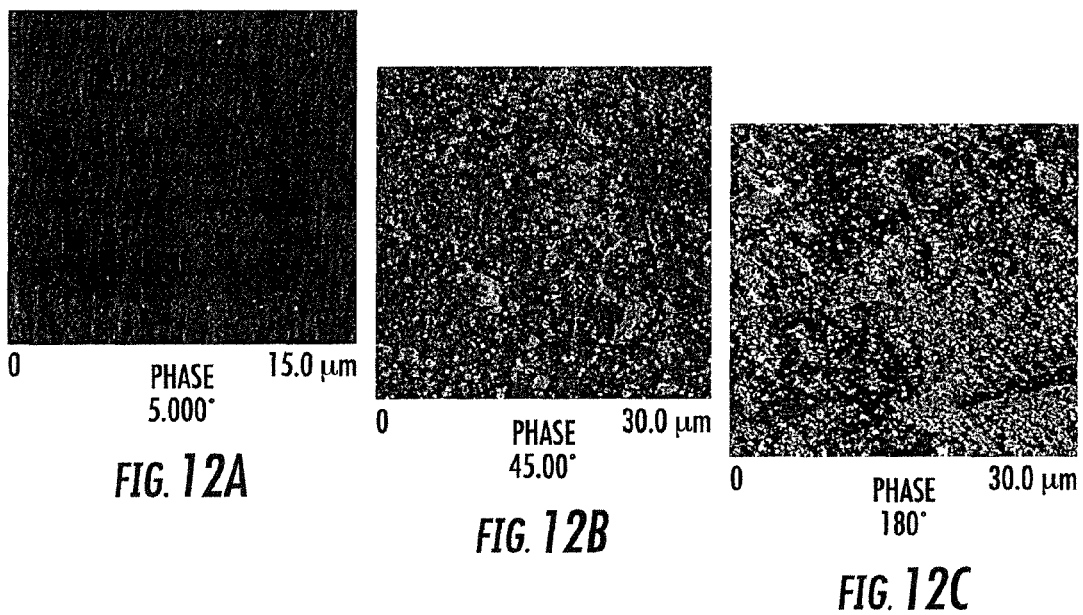
FIG. 12A
FIG. 12B
FIG. 12C

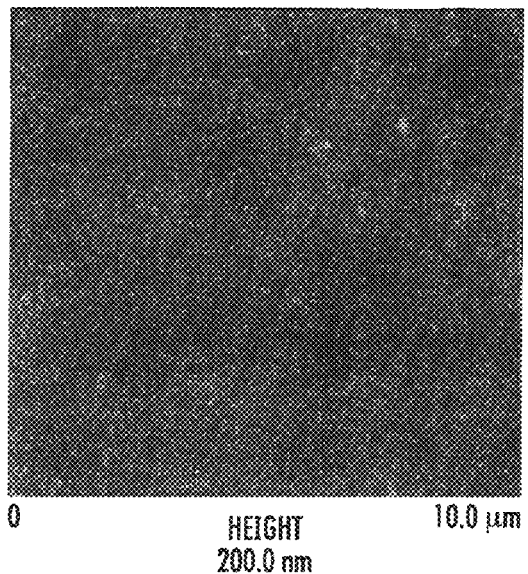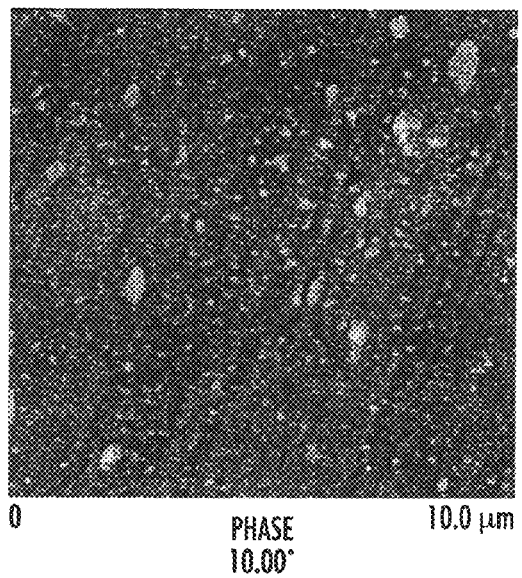
FIG. 19A  FIG. 19B
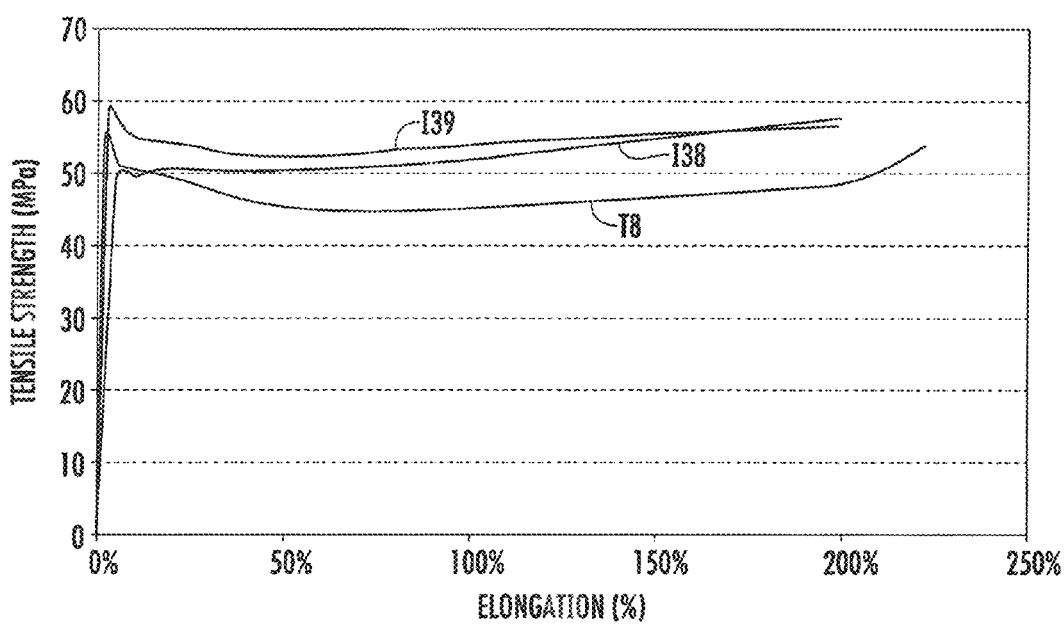
FIG. 20

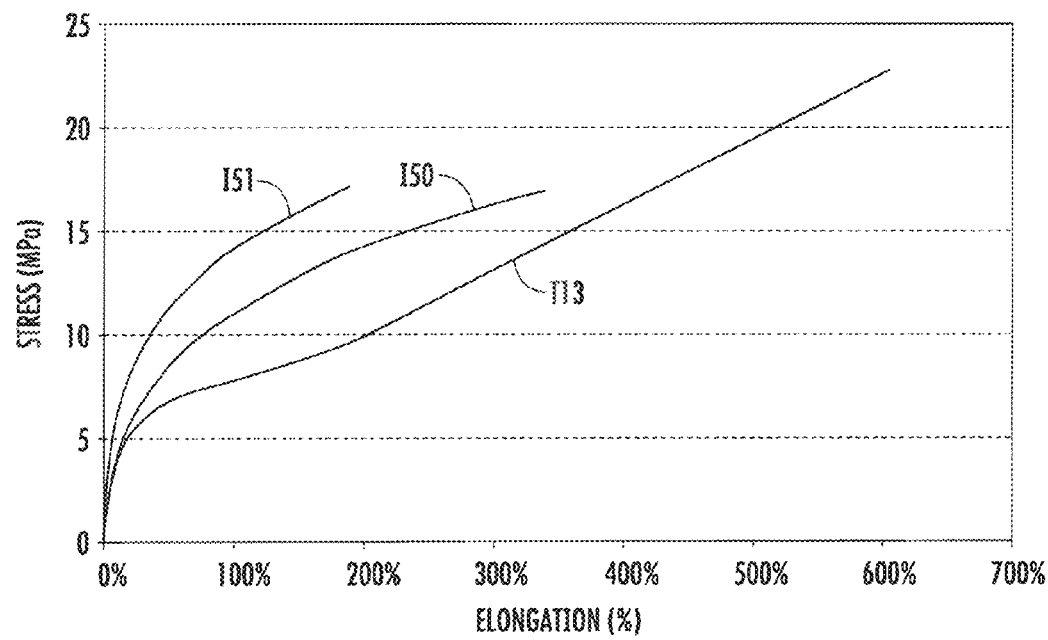
FIG. 26
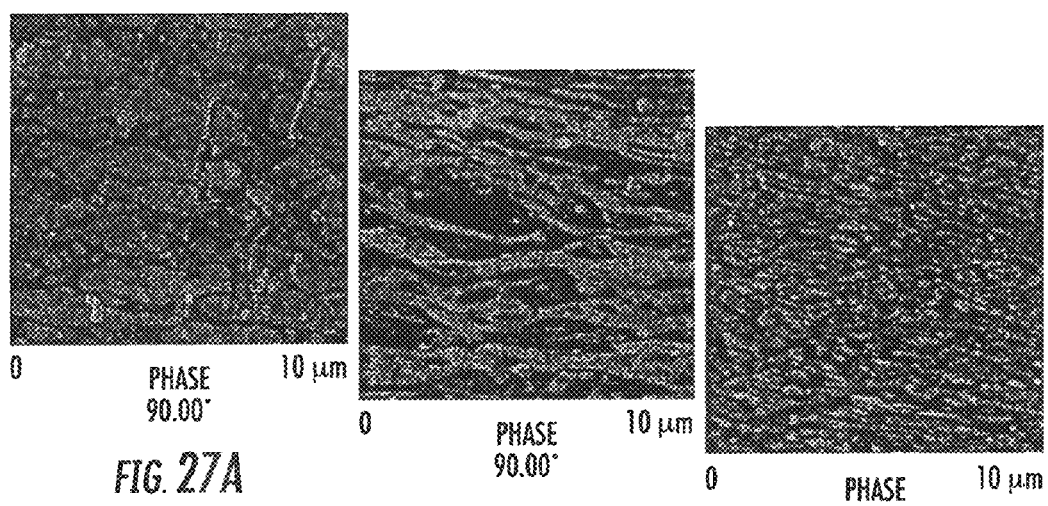
FIG. 27A
FIG. 27B
FIG. 27C

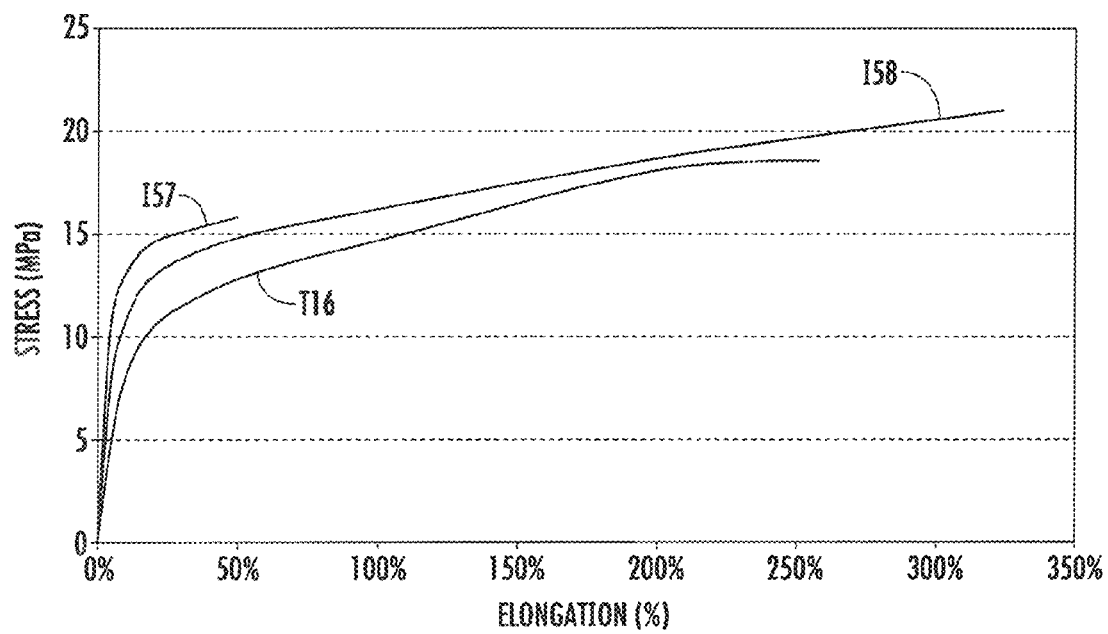
FIG. 32
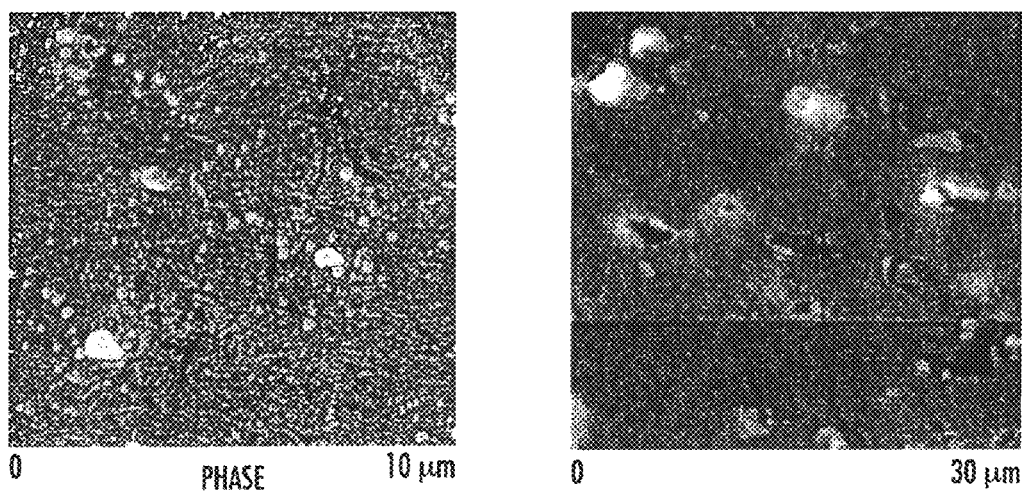
FIG. 33A
FIG. 33B

US 9,605,115 B2

PROCESS FOR PREPARING A REINFORCED AND REACTIVE THERMOPLASTIC COMPOSITION, AND THIS COMPOSITION

CROSS REFERENCE TO RELATED APPLICATIONS

This application is a divisional of U.S. application Ser. No. 13/196,500, now U.S. Pat. No. 8,784,711 filed Aug. 2, 2011, which claims priority to French Application No. 10 03268 filed Aug. 4, 2010, the entire contents of which are incorporated herein by reference.

FIELD OF THE INVENTION

The present invention relates to a process for preparing a reinforced and reactive thermoplastic composition, comprising a continuous phase which is based on at least one thermoplastic polymer and dispersed in which is a discontinuous phase based on at least one reactive reinforcing agent that may be immiscible with said at least one thermoplastic polymer, and also to a composition obtained by this process.

BACKGROUND

It is known to disperse, by reactive compounding, a thermosetting polymer in a thermoplastic matrix, whether this is in an internal mixer or in a twin-screw extruder, in order to obtain a thermoplastic/thermosetting blend that has improved mechanical properties in comparison to those of the thermoplastic matrix alone.

Mention may be made, for example, of the thesis report of Mrs Laure Meynié (defended on Jun. 9, 2003 before the Institut National des Sciences Appliquées in Lyons) entitled "Evolution et contrôle de la morphologie d'un melange thermoplastique/thermodurcissable polymerisé sous cisaillement" [Evolution and control of the morphology of a thermoplastic/thermosetting mixture polymerized under shear] (see in particular page 19 of this report), which presents the use of reactive extrusion for obtaining such dispersions. One drawback of the dispersion processes mentioned in this report is that a compatibilizing agent, such as a copolymer containing acrylate or methacrylate blocks, is required in order to compatibilize immiscible polymers, it being specified that the major part of this report relates to a mixture of miscible polymers and does not give details on the shear and profile characteristics of the extrusion screw elements, nor on the injection points of the reinforcing agents used. Another drawback of the dispersions obtained in this report lies in their relatively inhomogeneous nature in the thermoplastic matrix and also in the relatively coarse morphologies obtained for the epoxy resin nodules dispersed in an immiscible thermoplastic matrix (in general, with nodules having a number-average size greater than 10 μm and with demixing between the two phases).

Mention may also be made of the patent document U.S. Pat. No. 5,709,948 which presents thermoplastic compositions for example based on a polyolefin reinforced by an epoxy resin, which is dispersed via reactive compounding in a twin-screw extruder or in an internal mixer with a crosslinking agent of the resin. This document gives no indication on the morphology obtained for the epoxy resin nodules, whether in terms of fineness or homogeneity of the dispersion.

Document WO-A1-2007/001609 relates to a thermoplastic vulcanisate comprising an elastomeric discontinuous phase which is predominantly composed of a vulcanized EPDM rubber and which is dispersed in a thermoplastic continuous phase.

Document EP-A1-0 529 799 teaches the use of an elastomeric discontinuous phase which is predominantly composed of an SBS thermoplastic elastomer (containing polystyrene-polybutadiene-polystyrene blocks) and which is partially dispersed in a thermoplastic continuous phase using a compatibilizing agent.

Document US-A1-2005/0277737 teaches the use of an elastomeric discontinuous phase which is predominantly composed of a crosslinked nitrile rubber (NBR) and which is dispersed in a thermoplastic continuous phase.

SUMMARY OF THE INVENTION

One object of the present invention is to overcome the aforementioned drawbacks and this objective is achieved in that the applicant has unexpectedly just discovered that if at least one thermoplastic polymer and at least one reactive reinforcing chemical agent, that may be immiscible with the latter and that is selected from the group consisting of epoxy resins, polyorganosiloxanes having SiH functional group(s), diisocyanates or polyisocyanates and mixtures thereof, are subjected to reactive compounding with a shear rate greater than $10^2$ s$^{-1}$ and preferably greater than or equal to $10^3$ s$^{-1}$, then it is advantageously possible to obtain, via in situ grafting, branching (via side chains) and/or crosslinking of said at least one reinforcing agent onto the chain of said at least one thermoplastic polymer (this crosslinking resulting in a bonding of the polymer chains together) with optional addition of a crosslinking agent in a stoichiometric or non-stoichiometric amount, a reactive thermoplastic composition comprising a continuous phase which is based on said at least one thermoplastic polymer and dispersed in which, homogeneously (with a maximum standard deviation of 0.5 μm) and in the form of nodules having a number-average size of less than 5 μm, is a discontinuous phase based on said at least one reinforcing agent.

It should be noted that the expression "discontinuous phase based on said at least one reinforcing agent" is understood in the present description to mean that the discontinuous phase according to the invention consists exclusively (i.e. 100%) or at least consists predominantly (i.e. more than 50% and preferably more than 75%), by way of limitation, of an epoxy resin and/or of a polyorganosiloxane having SiH group(s) and/or of a diisocyanate or polyisocyanate, unlike the dispersions described in the last three documents mentioned above.

It will be noted that these very high values of the shear rate γ (which is conventionally defined by the ratio γ=υ/h, where υ is the linear speed of rotation in m·s$^{-1}$ of the screws in the case of an extruder or of the blades of the rotor in the case of an internal mixer and h is the passage width of the mixture in m, this rate possibly achieving values greater than or equal to $10^4$ s$^{-1}$ or even almost in the vicinity of $10^7$ s$^{-1}$), attest to shear forces of the mixture that are much higher than those used in the prior for obtaining reinforced thermoplastic compositions, and that this specific shear contributes substantially to the reactivity of said at least one reinforcing agent and surprisingly makes it possible to obtain a very fine and homogeneous dispersion in the thermoplastic matrix (with number-average sizes of nodules which may advantageously be between 50 nm and 2 μm and more advantageously still of 1 μm only with the maximum standard deviation of 0.5 μm). This high shear rate is thus essential for obtaining a homogeneous thermoplastic material characterized by this fine morphology in the case where said at least one reactive reinforcing agent is immiscible with said at least one thermoplastic polymer, which was not taught in the prior art presented above and especially in the aforementioned thesis report.

It will also be noted that, owing to this process according to the invention, the size of the nodules is advantageously substantially constant independently of the amount of reinforcing agent used and with a minimized standard deviation in comparison with the standard deviations obtained for the dispersions of the prior art.

According to another preferred feature of the invention, this reactive compounding is carried out under a non-inert atmosphere (i.e. typically in air, unlike the standard inert atmospheres of nitrogen or of argon) and at a temperature at least 30 C above the melting point of said thermoplastic polymer or of that of said thermoplastic polymers which is the highest.

Advantageously, it is possible for there to be no compatibilizing agent between said phases during this reactive compounding, even when the thermoplastic polymer and the reactive reinforcing agent used are immiscible or not very miscible. This process of the invention thus makes it possible to do away with standard compatibilizing agents of terpolymer type containing "SBM" (polystyrene/1,4-butadiene/polymethyl methacrylate), or "MAM" (polymethyl methacrylate/polybutyl acrylate/methyl methacrylate) blocks or other copolymers having acrylate or methacrylate segments. The addition of such a compatibilizing agent may however make it possible to improve the properties of the composition obtained.

As a variant, it is possible to use, during this reactive compounding, at least one compatibilizing agent between these phases, which is selected from the group consisting of monomers, oligomers and random or block polymers having at least one acrylate, methacrylate or amine functional group and polyolefins grafted preferably by a maleic anhydride, and this compatibilizing agent is preferably one such grafted polyolefin, in particular in the case where said at least one thermoplastic polymer is polyolefinic.

Advantageously, this reactive compounding may be carried out in a preferably co-rotating or as a variant counter-rotating twin-screw extruder (it being specified that the aforementioned passage width h for the measurement of the shear rate is then equal to the space between the two screws and that this shear rate may, for example, be between $10^3$ $s^{-1}$ and $10^4$ $s^{-1}$), in at least one pass and with a residence time of said phases which may be between 1 min and 2 min. It is possible, in this case, to introduce said at least one reinforcing agent into the extruder using a pump, for example a peristaltic pump (it being specified that any other pumping system provided at the start, in the middle or at the end of the extrusion can be used), following the introduction of said at least one thermoplastic polymer.

It will be noted that this very high shear rate is used in the process of the invention in relation with a very severe screw profile for the extruder. It will be noted that this type of very high shear profile is essential for the compounding of the phases when said at least one thermoplastic polymer and said at least one reinforcing agent are immiscible, and that it makes it possible to do away with compatibilizing agents.

As a variant, this reactive compounding may be carried out in an internal mixer or preferably in a high-speed mixer (it being specified that the aforementioned passage width h for the measurement of the shear rate is then equal to the space between the blades of the rotor and the wall of the mixer and that this shear rate may, for example, be between $10^3$ $s^{-1}$ and $10^7$ $s^{-1}$), by simultaneously or non-simultaneously introducing therein said at least one thermoplastic polymer and said at least one reinforcing agent. In this case also, high shear rates are essential for the proper compounding of said at least one thermoplastic polymer and of said at least one reinforcing agent. It will be noted that the manual control of the shear rate is important for this internal or high-speed mixer.

BRIEF DESCRIPTION OF THE DRAWINGS

The aforementioned features of the present invention, and also other features, will be better understood on reading the following description of several examplary embodiments of the invention, given by way of illustration and nonlimitingly in relation to the appended drawings, among which:

FIG. 11 is a stress-elongation graph showing three curves of extruded compositions based on a PEBA and reinforced according to the first embodiment of the invention with an epoxy-amine, in comparison with a control curve relating to this PEBA alone;

FIGS. 12a, 12b and 12c are three atomic force microscope images showing the morphology of three extruded compositions based on a PEBA, respectively a control composition consisting of this PEBA alone, a composition according to the first embodiment with 7 parts by weight of epoxy-amine and a composition according to the second embodiment with 1 part by weight of PDMS-SiH;

FIGS. 19a and 19b are two atomic force microscope images showing, in different phases, the morphology of a composition according to this third embodiment based on PEBA and MDI;

FIG. 20 is a stress-elongation graph showing two curves of extruded compositions according to the invention based on a polyamide PA-6 and reinforced according to the first embodiment of the invention respectively with an epoxy resin and with an epoxy-amine, in comparison with a control curve relating to this PA-6 alone;

FIG. 26 is a stress-elongation graph showing two curves of extruded compositions according to the invention based on a TPU+PEBA mixture reinforced in situ with an epoxy-amine and pre-reinforced with this epoxy-amine, respectively, on comparison with a control curve relating to this TPU+PEBA mixture alone;

FIGS. 27a, 27b and 27c are three atomic force microscope images showing the respective morphologies of these three compositions relating to FIG. 26 according to the first embodiment of the invention;

FIG. 32 is a stress-elongation graph showing a curve of extruded composition according to the invention based on a COPE reinforced with an epoxy-amine, in comparison with a control curve relating to this unreinforced COPE;

FIGS. 33a and 33b are two atomic force microscope images showing the morphologies of two extruded compositions according to the invention based on a COPE reinforced with 25 parts by weight of epoxy resin and with 35 parts by weight of epoxy-amine, respectively.

DETAILED DESCRIPTION

Figure 1:
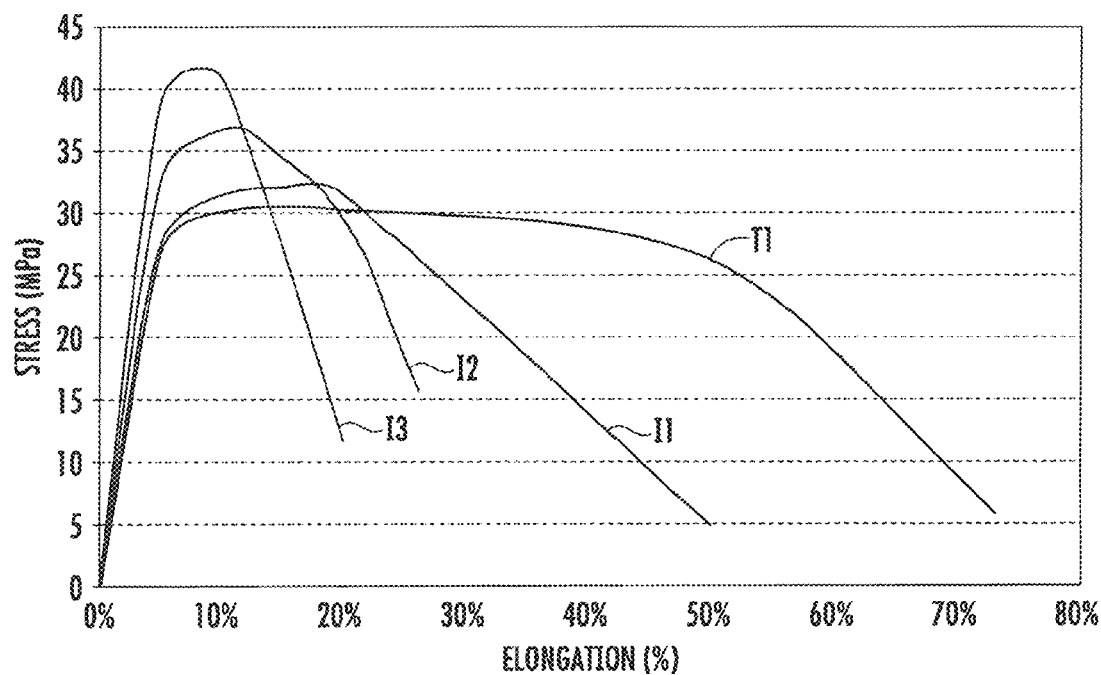
FIG. 1 is a stress-elongation graph showing three curves of compositions according to the first embodiment of the invention where the continuous and discontinuous phases are respectively based on a high-density polyethylene and on an epoxy resin optionally with an amine crosslinking agent, and a control curve relating to this polyethylene alone.

According to a first embodiment of the invention which may be carried out either in a twin-screw extruder or in an internal mixer, use is made, for said at least one reinforcing agent, of an at least partially crosslinked or non-crosslinked epoxy resin which is present in the composition in an amount between 0.5 and 60 parts by weight per 100 parts of thermoplastic polymer(s), this epoxy resin preferably being selected from the group consisting of bisphenol A epoxy resins, bisphenol F epoxy resins, glycol epoxy resins, brominated epoxy resins, novolac epoxy resins, phenolic epoxy resins, epoxy resins based on vinyl and/or glycidyl ether, monomers, oligomers and block polymers of these resins and mixtures thereof.

Advantageously, according to this first embodiment, it is possible for no crosslinking system for said epoxy resin to be used, which epoxy resin thus reacts under a non-inert atmosphere in situ radically (i.e. via a shear generating the formation of radicals in situ) with said at least one thermoplastic polymer in the style of a terminating agent.

As a variant, a crosslinking system for this epoxy resin can be used which is selected from the group consisting of dietheramines or polyetheramines, amine-functionalized di(dimethylsiloxanes) or polydimethylsiloxanes, aliphatic and aromatic hydrocarbon-based diamines or polyamines (which may be both saturated and unsaturated), polyphenylene sulfone amines, dianhydrides or polyanhydrides and dicyanamides or polycyanamides.

In the case where a twin-screw extruder is used, it is possible to coextrude, during a first pass, the epoxy resin and the thermoplastic matrix then, after heat treatment or no heat treatment, during a second pass, to incorporate a crosslinking agent which in situ crosslinks the pre-grafted, pre-branched and/or pre-crosslinked resin, optionally supplemented by an accelerator agent (e.g. an imidazole or a urone) in order to correlate the crosslinking kinetics of the epoxy resin to the screw profile of the extruder and to the residence time of the material in this extruder.

According to a second embodiment of the invention which may be carried out either in a twin-screw extruder or in an internal mixer, use is made of a polyorganosiloxane having SiH functional groups along the chain or at the chain ends (e.g. a PDMS-SiH (polydimethylsiloxane-SiH)), for said at least one reinforcing agent, in an amount between 0.1 and 40 parts by weight per 100 parts by weight of thermoplastic polymer(s).

According to a third embodiment of the invention which may be carried out either in a twin-screw extruder or in an internal mixer, use is made of a diisocyanate or polyisocyanate, for said at least one reinforcing agent, in an amount between 0.5 and 30 parts by weight per 100 parts by weight of thermoplastic polymer(s), this diisocyanate or polyisocyanate preferably being selected from the group consisting of diphenylmethane-4,4'-diisocyanate (MDI), toluene-2,4-diisocyanate (TDI), hexamethylene-1,6-diisocyanate (HDI), polymethylene polyphenyl isocyanate (PMPPI) and mixtures thereof.

A reactive thermoplastic composition according to the invention comprises a continuous phase which is based on at least one thermoplastic polymer and dispersed in which is a discontinuous phase based on at least one reactive reinforcing chemical agent that may be immiscible with this (these) thermoplastic polymer(s) and that is selected from the group consisting of epoxy resins, polyorganosiloxanes having SiH functional group(s), diisocyanates or polyisocyanates and mixtures thereof, and this composition which is free of any compatibilizing agent between these phases comprises the product of an in situ reaction of grafting, branching and/or crosslinking, by a reactive compounding of these phases under a shear rate greater than $10^2$ $s^{-1}$ and preferably greater than or equal to $10^3$ $s^{-1}$, of said at least one reinforcing agent onto the chain of said at least one thermoplastic polymer, so that the latter has (have), via this reactive compatibilization reaction, a grafted, branched (by side chains) and/or crosslinked structure, said discontinuous phase being dispersed homogeneously in said continuous phase in the form of nodules having a number-average size of less than 5 µm (as indicated previously, these nodules advantageously have a substantially constant size independently of the amount of reinforcing agent and with a standard deviation of only 0.5 µm compared to the nodules of the prior art).

It will be noted that this more or less grafted, branched and/or crosslinked structure which is obtained results in a substantial increase in the viscosity of the composition following the reactive compounding.

It will also be noted that the nature of the reinforcing agent/thermoplastic polymer(s) pair and also the conditions of the preparation process make it possible to control the amount of grafting, branching and/or crosslinking, depending on the case.

Moreover, it will be noted that the control of the chemical reaction kinetics, of the proportions of each constituent and of the operating parameters makes it possible to play with the final structure and with the final morphology of the reinforced thermoplastic composition.

Advantageously, the compositions of the invention have improved isotropic mechanical properties in comparison with those of said at least one thermoplastic polymer that they incorporate and which would be free of the discontinuous phase, such as a minimized creep, relaxation under stress and yield point and an improved Young's modulus, impact strength and tensile strength.

The reinforced compositions according to the invention thus have, in particular, a limited creep, and have homogeneous and isotropic properties that rival those of known thermoplastic compositions reinforced, for example, with glass fibers while retaining, in particular, the elongation at break and the processability of thermoplastic polymers.

In other words, the reinforcements used to obtain these compositions of the invention enable an intrinsic modification of the material and make it possible to obtain a "visco-elasto-plastic" material from a viscoplastic material, by improving the mechanical and dynamic properties of the thermoplastic matrix used (in tension, in compression, in shear, under impacts and in flexion) and by modifying, or even eliminating, the yield point of the composition almost without impairing its processability (i.e. allowing the conversion or recycling thereof under good conditions, which is not the case for known thermoplastic compositions reinforced by fibers).

By way of example, mention may especially be made, for these improved mechanical properties, of:

- a tensile modulus at 50% strain advantageously greater than or equal to 40 MPa for compositions according to the invention based on a PEBA;
- a tensile modulus at 10% strain advantageously greater than or equal to 40 MPa for compositions according to the invention based on a polyethylene;
- a tensile modulus at 10% strain advantageously greater than or equal to 35 MPa for compositions according to the invention based on a polypropylene;
- a tensile modulus at 100% strain advantageously greater than or equal to 14 MPa for compositions according to the invention based on a TPU; and
- a tensile creep strain measured according to the ISO 899-1 standard at 100° C. and on test specimens of 1A type, which is:
  - less than 4% for compositions according to the invention based on a PEBA (under a stress of 5 MPa);
  - less than 1.5% for compositions according to the invention based on a polypropylene (under a stress of 2.5 MPa); and
  - less than 7% for compositions according to the invention based on a polyamide PA-6 (under a stress of 15 MPa).

The optional (i.e. not needed in order to obtain these improved properties) nature of a post-curing of the composition following the reactive compounding according to the invention may furthermore be noted, it being specified that this final post-curing step may nevertheless prove useful for improving the level of reinforcement of the thermoplastic matrix. In other words, the reinforced thermoplastic compositions according to the invention may be used without post-curing, but their properties may be further improved after post-curing. Without post-curing, these compositions according to the invention are reactive because not all the functions provided by the reactive reinforcing agent can react solely during the preparation process thereof and may therefore be subsequently used as is. With a post-curing, the morphology of the composition is set a posteriori and it is possible to finish converting the reactive functions that have not completely reacted during the preparation thereof.

In reference to the first aforementioned embodiment of the invention, said at least one reinforcing agent is of thermosetting type and may comprise an at least partially crosslinked or non-crosslinked epoxy resin in an amount between 0.5 and 60 parts by weight per 100 parts of thermoplastic polymer(s), this epoxy resin preferably being selected from the group consisting of bisphenol A epoxy resins, bisphenol F epoxy resins, glycol epoxy resins, brominated epoxy resins, novolac epoxy resins, phenolic epoxy resins, epoxy resins based on vinyl and/or glycidyl ether, monomers, oligomers and block polymers of these resins and mixtures thereof. The composition according to the invention may be free of any crosslinking system for this epoxy resin, which epoxy resin reacts under a non-inert atmosphere in situ radically (i.e. by a shear generating the formation of radicals in situ) with said at least one thermoplastic polymer in the style of a terminating agent, or else as a variant may comprise such a crosslinking system which may be selected from the group consisting of dietheramines or polyetheramines, amine-functionalized di(dimethylsiloxanes) or polydimethylsiloxanes, hydrocarbon-based diamines or polyamines, polyphenylene sulfone amines, dianhydrides or polyanhydrides and dicyanamides or polycyanamides.

As will appear in the detailed description below of several examples of the invention relating to this first embodiment, it will be noted that the reinforcing effect obtained is of different nature depending on the thermoplastic matrix used and the nature of the reactive reinforcing agent selected. In the case of thermoplastic polymers having basic functions of amide or urethane type, such as polyether-block-amides (PEBAs) or polyamides (PAs) or thermoplastic polyurethanes (TPUs), the simple addition of an epoxy resin induces an instantaneous reinforcing effect without even crosslinking this resin, this reinforcement however being increased the by the crosslinking thereof.

In reference to the second aforementioned embodiment of the invention, said at least one reinforcing agent may comprise a polyorganosiloxane having SiH functional groups along the chain or at the chain ends, in an amount between 0.1 and 40 parts by weight per 100 parts of thermoplastic polymer(s).

In reference to the third aforementioned embodiment of the invention, said at least one reinforcing agent may comprise a diisocyanate or polyisocyanate in an amount between 0.5 and 30 parts by weight per 100 parts by weight of thermoplastic polymer(s), this diisocyanate or polyisocyanate preferably being selected from the group consisting of diphenylmethane-4,4'-diisocyanate (MDI), toluene-2,4-diisocyanate (TDI), hexamethylene-1,6-diisocyanate (HDI), polymethylene polyphenyl isocyanate (PMPPI) and mixtures thereof.

Generally, it will be noted that the reinforcing effect may optionally be accentuated by drawing—therefore hypercrystallization—of these reinforced thermoplastic polymers (the mixtures obtained being able to be converted according to the customary means for converting thermoplastics).

Advantageously, said at least one thermoplastic polymer may be selected from the group consisting of homopolymers and copolymers of olefins, aliphatic polyamides, semi-aromatic polyamides and aromatic polyamides of polyphthalamide type, polyimides (PIs), polyamideimides (PAIs), polyetherimides (PEIs), thermoplastic elastomers (TPEs), polyphenylene sulfones, polyether sulfones (PESs), polystyrenes (PSs), polysulfones (PSUs), polyesters, polyethylene oxides and polymers of other olefinic monomer oxides, polyphenylene sulfides (PPSs), polyether ether ketones (PEEKs), polyether ketones (PEKs), polyether ketone ketones (PEKKs), block copolymers thereof and mixtures thereof, and is preferably selected from the group consisting of polypropylenes, propylene/ethylene, propylene/hexene, ethylene/butene and ethylene/octene copolymers, polyethylenes, copolyesters (COPEs), polyether-block-amides (PEBAs), thermoplastic polyurethanes (TPUs), polyamides PA-6, PA-4,6, PA-6,6, PA-6,6,6, PA-11, PA-12, block copolymers thereof and mixtures thereof.

According to particularly advantageous exemplary embodiments of the invention mentioned nonlimitingly:

the continuous phase is based on at least one polyether-block-amide (PEBA), and the discontinuous phase is based on at least one epoxy resin and preferably on a crosslinking system of amine type; or the continuous phase is based on a thermoplastic polyurethane (TPU), and the discontinuous phase is based on a polyorganosiloxane having SiH functional group(s) or on a diisocyanate or polyisocyanate; or else the continuous phase is based on a mixture of at least one polyether-block-amide (PEBA) and of a thermoplastic polyurethane (TPU), and the discontinuous phase is based either on at least one epoxy resin and preferably on an amine crosslinking system, or on a diisocyanate or polyisocyanate; or else the continuous phase is based on a polyamide, and the discontinuous phase is based on at least one epoxy resin and preferably on an amide crosslinking system with or without an agent having amine, acrylate or methacrylate blocks.

Generally, in reference to everything which has just been stated, it will be noted that the preparation process (i.e. with extrusion or compounding) should be adjusted in order to control the reaction kinetics of the phases. Indeed, parameters such as the extrusion time or compounding time, the shear rate and the conversion temperature should be adjusted for each thermoplastic polymer(s)/reactive reinforcing agent(s) pair, in order to qualitatively control the degree of grafting, of branching and/or of crosslinking of the reactive agent onto the thermoplastic polymer(s). Thus, a reinforced thermoplastic phase is obtained which is reactive, due to the fact that it still has, after production, some reactive functions of the agent that have reacted, under the effect of the shear or not, with the side functions or functions at the chain end(s) of the thermoplastic phase. This adjustment of the process parameters thus makes it possible to play with the miscibility and the reactivity of the phases and is therefore an essential element for this type of coupling, making it possible to couple not only various reactive phases to one thermoplastic phase, but in addition to leave residual reactive functions on the polymer chain(s) of said at least one reinforced thermoplastic polymer which allow the reactive thermoplastic compositions of the invention (thus more or less grafted, branched and/or crosslinked) to react subsequently with other phases by being able to be used to form a reactive system selected from the group consisting of interphase compatibilizing systems, systems for sizing fibers in composites and systems for dispersing fillers in thermoplastic phases.

It may also be noted that the process according to the invention makes it possible, unlike the prior art, to intimately mix a large proportion (up to 60 parts by weight) of reinforcing agent of monomer, oligomer or polymer (e.g. an resin epoxy) type with an immiscible thermoplastic phase despite the large difference in viscosity between this agent and this phase, owing in particular to the high shear used and to controlled injection points for the reactive reinforcing agent, and to graft, branch and/or crosslink this phase in situ without difficulty.

In the following examples, use was made, for the reactive extrusion, of a CLEXTRAL EVOLUM 032 co-rotating twin-screw extruder with a P10 screw profile, a rotational speed of the screws between 250 and 350 rpm, a speed of the cutting system between 800 and 1500 rpm, and a temperature profile to be adjusted as a function of the thermoplastic matrix chosen.

This extruder essentially comprised a transport zone (length L=16 mm and screw elements of C2F type), followed by a feed zone (L=120 mm and screw of T2F type), a transport zone (L=96 mm and screw of C2F type), a mixing zone (L=240 mm and screw of BL22 type), a transport zone (L=208 mm and screw of C2F type), a dispersing zone (L=48 mm and screw of C2FF type, with a pitch of 16 mm), a mixing zone (L=320 mm and screw of BL22 then BL33 then BL20 then BL00 then BL20 type), a transport zone (L=144 mm and screw of C2F type), a dispersing zone (L=32 mm and screw of C2FF type, with a pitch of 16 mm), a mixing zone (L=64 mm and screw of BL22 type) then finally a transport zone (L=376 mm and screw of C2F type).

Regarding the first embodiment of the invention relating to the reinforcement by means of an epoxy-amine, use was preferably made of two passes in this extruder with a residence time of around 1 minute and 15 seconds, with for example:

for the first pass, incorporation of the thermoplastic polymer(s) via the feed hopper at 65° C. for example into the first feed zone, then injection into this zone, and at the same temperature, of the epoxy resin with the peristaltic pump; and for the second pass, incorporation of the thermoplastic polymer(s) pre-loaded with epoxy resin following the first pass, via this feed hopper (in this same feed zone at 65° C. for example), then injection into this zone, and at the same temperature, of the amine crosslinking agent with the peristaltic pump.

Figure 6:
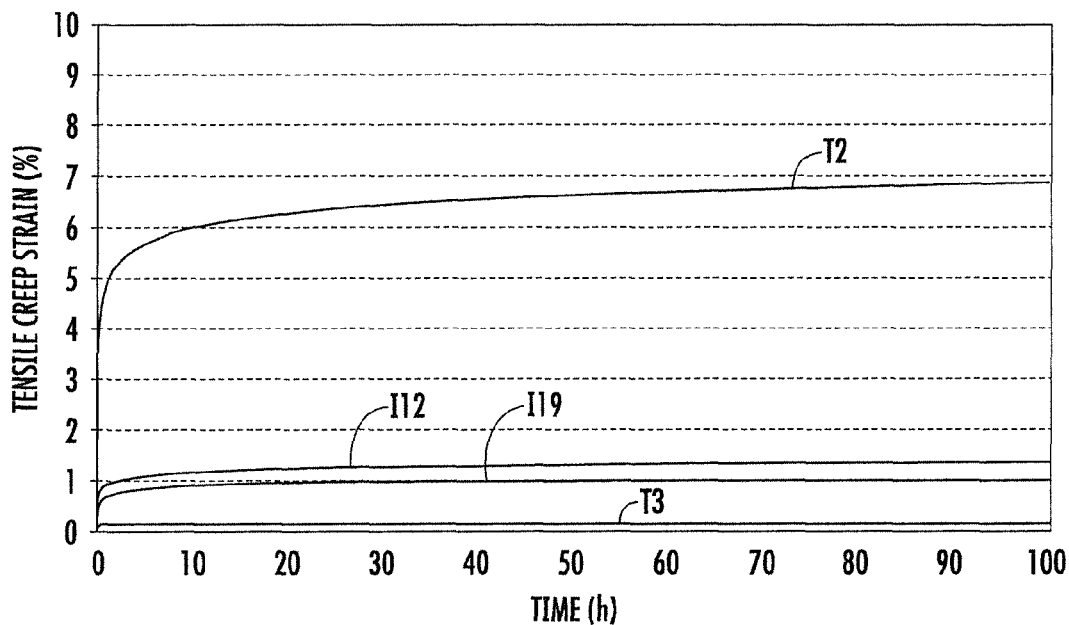
FIG. 6 is a tensile creep strain-time graph showing, in comparison to two control curves relating to a polypropylene reinforced by glass fibers and to this polypropylene alone, a curve according to the first embodiment of the invention based on this polypropylene and on an epoxy-amine which are extruded and a curve according to the second embodiment of the invention based on a this polypropylene and on PDMS-SiH (polydimethylsiloxane-SiH) which are extruded.
Figure 14:
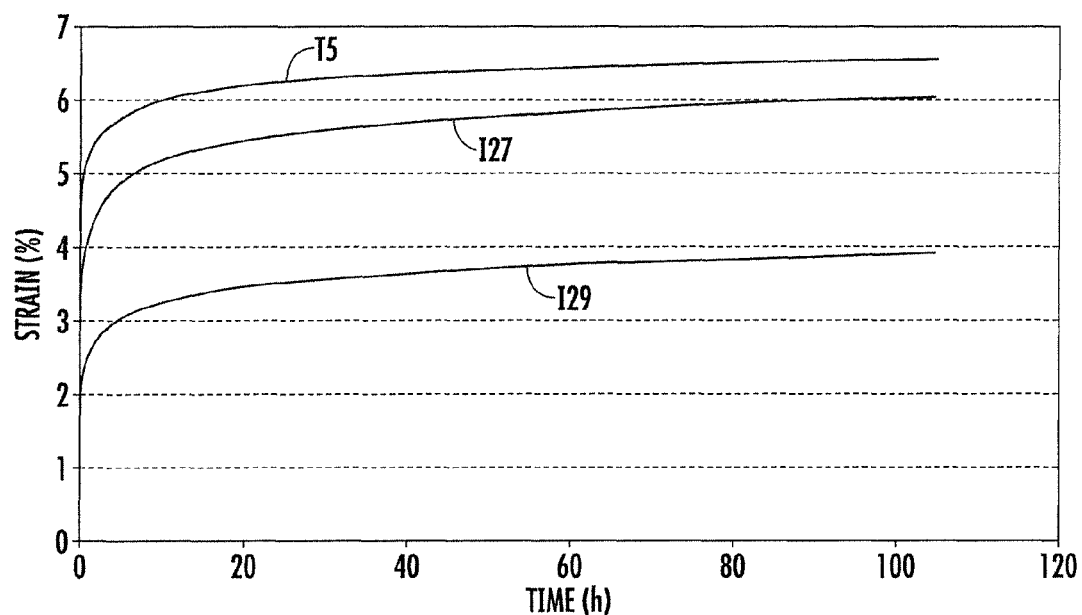
FIG. 14 is a tensile creep strain-time graph showing, in comparison with a control curve relating to the PEBA alone, two curves according to the first embodiment of the invention based on this PEBA and on an epoxy-amine which are extruded.
Figure 15:
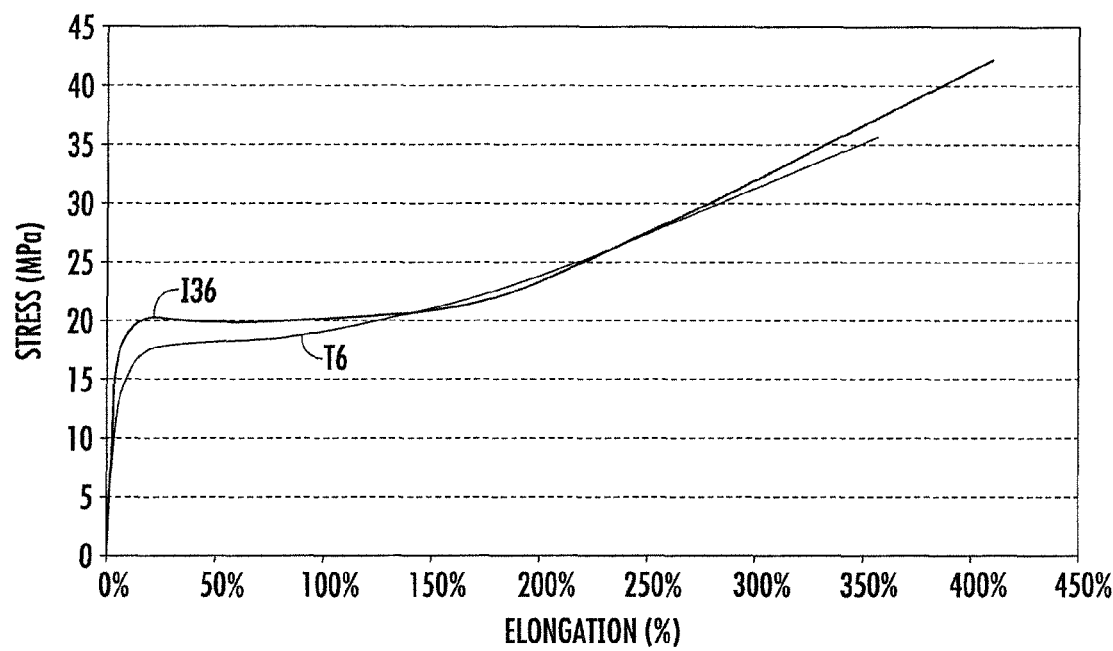
FIG. 15 is a stress-elongation graph showing a curve of an extruded composition based on a PEBA reinforced according to the second embodiment of the invention with a PDMS-SiH, in comparison with a control curve relating to this PEBA alone.
Figure 23:
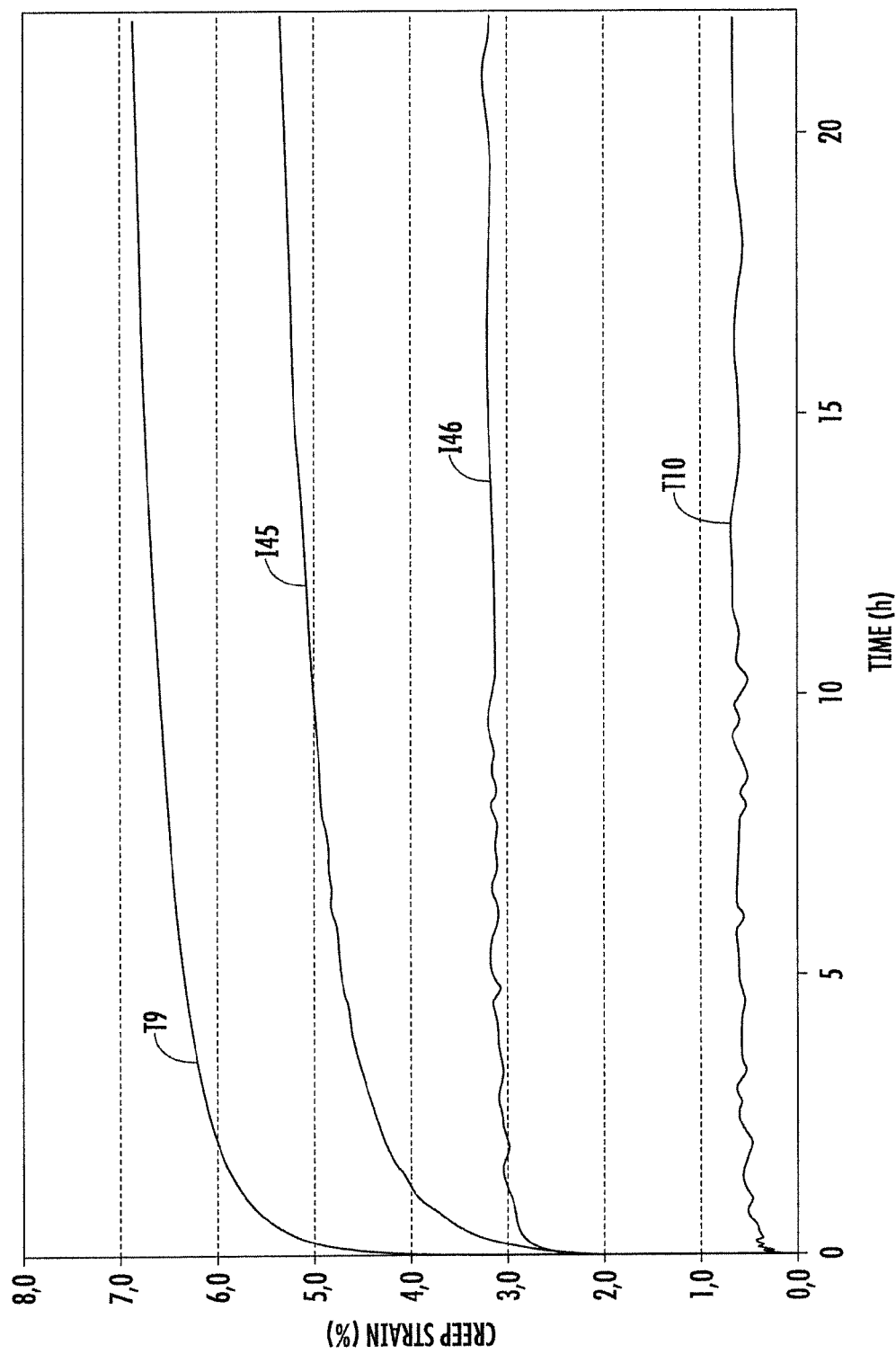
FIG. 23 is a tensile creep strain-time graph showing, in comparison with two control curves relating to the PA-6 alone from FIGS. 21 and 22 and to this PA-6 reinforced with glass fibers, two curves of extruded compositions according to the invention based on this PA-6 reinforced with an epoxy resin and with a PDMS-SiH, respectively.

The tensile creep strain curves were established in accordance with the ISO 899-1 standard, at 100° C. and on test specimens of 1A type with, for FIGS. 6, 14 and 23, imposed stresses respectively of 2.5 MPa (i.e. 10 kg/test specimen); of 5 MPa (i.e. 20 kg/test specimen) and of 15 MPa (i.e. 60 kg/test specimen).

The CHARPY impact strength at ambient temperature was measured by the Charpy test according to the ISO 179-1 standard (2000) method 1 eU, with a potential energy of 7.5 joules.

The rheology characteristics (frequency sweep) were obtained with an ARES rheometer at 180° C.

EXAMPLES

Figure 2A:
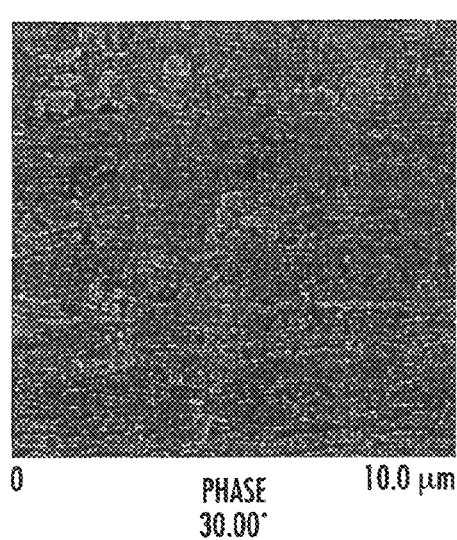
FIGS. 2a and 2b are two atomic force microscope images showing the morphology of two compositions according to this first embodiment, both based on a high-density polyethylene and on an epoxy resin with an amine crosslinking agent, that are respectively obtained in an internal mixer and a twin-screw extruder.
Figure 2B:
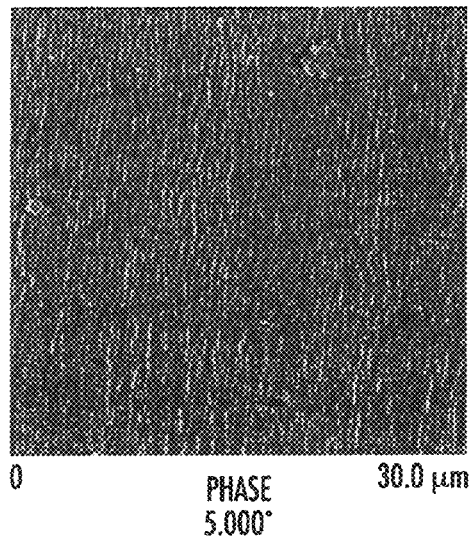

1) Reinforcement of a High-Density Polyethylene with an Epoxy Resin and with a PDMS-SiH (See FIGS. 1-2*b*)

Table 1 below gives seven compositions I1 to I7 according to the first embodiment of the invention based on an HDPE and reinforced with an epoxy resin optionally crosslinked with an amine, in comparison with a control composition T1.

TABLE 1

|  | T1 | I1 | I2 | I3 | I4 | I5 | I6 | I7 |
| --- | --- | --- | --- | --- | --- | --- | --- | --- |
| HDPE | 100 | 100 | 100 | 100 | 100 | 100 | 100 | 100 |
| DER331 |  |  | 5 |  | 2.5 |  | 1.25 | 1.25 |
| DER330 |  |  |  | 5 |  |  |  |  |
| DER667 |  |  |  |  |  | 17 |  |  |

TABLE 1-continued

|  | T1 | I1 | I2 | I3 | I4 | I5 | I6 | I7 |
|---|---|---|---|---|---|---|---|---|
| Epikote 1001 |  | 5.6 |  |  |  |  |  |  |
| Jeffamine T403 |  | 1 | 2 | 2 | 1 | 0.77 |  | 0.5 |
| TENSION |  |  |  |  |  |  |  |  |
| Stress at break, |  |  |  |  |  |  |  |  |
| average, MPa | 5.8 | 9.9 | 11.2 | 3.7 | 7.1 | 2.9 | 9.9 | 10.4 |
| standard deviation | 2.9 | 3.9 | 6.4 | 3.4 | 5.2 | 0.4 | 3.9 | 1.7 |
| yield stress, |  |  |  |  |  |  |  |  |
| average, MPa | 30.3 | 28.4 | 30.8 | 42.3 | 29.6 | / | 30.9 | 30.4 |
| standard deviation | 0.3 | 1.4 | 0.2 | 0.5 | 0.7 |  | 0.3 | 0.4 |
| Moduli |  |  |  |  |  |  |  |  |
| 5% modulus | 27 | 26 | 26.6 | 39.1 | 27.9 | 28.1 | 25 | 25.8 |
| 10% modulus | 30 | 28 | 30.4 | 40.9 | 29.4 | 29.9 | 29.7 | 29.7 |
| 20% modulus | 30 | 28 | 30.7 | 11.6 | 29.4 |  | 30.9 | 30.4 |
| 50% modulus | 26 |  | 24.2 |  | 20.5 |  | 20.5 | 23.9 | where DER331 and DER330 are liquid epoxy resins, DER667 and Epikote 1001 are solid epoxy resins, and Jeffamine T403 is a short amine.

This table 1 shows an improvement in the stress at break, in the yield stress and in the moduli via addition of the epoxy resin optionally crosslinked in situ in the form of epoxy-amine, it being specified that the nature and the amount of this epoxy resin have an influence on this improvement in the reinforcement. FIG. 1 shows the superiority of compositions I1, I2 and I3 relative to the control T1, up to 20% elongation.

Table 2 below furthermore shows the improvement of the mechanical properties of a composition I8 based on an HDPE via addition of a PDMS-SiH (of H-siloxane tradename), in accordance with the second embodiment of the invention.

TABLE 2

|  | T1 | I8 |
|---|---|---|
| HDPE | 100 | 100 |
| H-siloxane |  | 1 |
| Average elongation at break % | 127 | 134 |
| standard deviation | 40 | 17 |
| Average stress at break MPa | 13 | 13.8 |
| standard deviation | 0.3 | 0.4 |
| 20% modulus | 20.2 | 19.9 |
| 50% modulus | 16.4 | 16.9 |
| 100% modulus | 13.4 | 15.2 |

Table 3 below shows the influence of a compatibilizing agent of maleic anhydride-grafted polyolefin type, which makes it possible to improve the reinforcement via a compatibilization of the phases:

TABLE 3

|  | T1 | I9 | I10 | I11 | I2 |
|---|---|---|---|---|---|
| HDPE | 100 | 100 | 100 | 100 | 100 |
| PO1020 |  | 1 | 1 | 1 |  |
| DER331 |  |  | 5 | 5 | 5 |
| Jeffamine T403 |  |  |  | 2 | 2 |
| TENSION |  |  |  |  |  |
| stress at break, |  |  |  |  |  |
| average, MPa | 5.8 | 10.5 | 8.5 | 15.5 | 11.2 |
| standard deviation | 2.9 | 1.9 | 2.4 | 4.5 | 6.4 |
| yield stress, |  |  |  |  |  |
| average, MPa | 30.3 | 35 | 33.8 | 36.8 | 30.8 |
| standard deviation | 0.3 | 1 | 0.6 | 0.4 | 0.2 |

TABLE 3-continued

|  | T1 | I9 | I10 | I11 | I2 |
|---|---|---|---|---|---|
| 5% modulus | 27 | 31.5 | 28.7 | 32.7 | 26.6 |
| 10% modulus | 30 | 34.9 | 33.3 | 36.6 | 30.4 |
| 20% modulus | 30 | 32.6 | 33.3 | 29.5 | 30.7 |
| 50% modulus | 26 |  |  |  | 24.2 | where PO 1020 is a maleic anhydride-grafted polypropylene.

Table 4 below shows the influence of a post-curing and of a re-conversion of the material:

TABLE 4

|  | T1 | I4 | I4 post-cured for 3 h at 100° C. | I4 reprocessed | I4 reprocessed then post-cured for 3 h at 100° C. |
|---|---|---|---|---|---|
| HDPE | 100 | 100 | 100 | 100 | 100 |
| DER331 |  | 2.5 | 2.5 | 2.5 | 2.5 |
| DER667 |  |  |  |  |  |
| Jeffamine T403 |  | 1 | 1 | 1 | 1 |
| TENSION |  |  |  |  |  |
| stress at break, |  |  |  |  |  |
| average, MPa | 5.8 | 7.1 | 9 | 12 | 15.7 |
| standard deviation | 2.9 | 5.2 | 1.1 | 2.1 | 0.8 |
| yield stress, |  |  |  |  |  |
| average, MPa | 30.3 | 29.6 | 32.8 | 34.1 | 35.4 |
| standard deviation | 0.3 | 0.7 | 0.1 | 0.4 | 0.4 |
| elongation at yield, |  |  |  |  |  |
| average, % | 20 | 15 | 16 | 12 | 14 |
| standard deviation | 0 | 1 | 2 | 1 | 1 |
| 5% modulus | 27 | 27.9 | 28.4 | 30.6 | 30.8 |
| 10% modulus | 30 | 29.4 | 32 | 34 | 35.1 |
| 20% modulus | 30 | 29.4 | 32.7 | 33.1 | 34.8 |
| 50% modulus | 26 | 20.5 | 12 |  |  |

Table 4 shows that this post-curing makes it possible to improve the reinforcement, and that this re-conversion (with or without post-curing) makes it possible to preserve or even improve this reinforcement.

FIG. 2a shows that the composition I5 of the invention, which is obtained in an internal mixer, has a lamellar morphology for the dispersion of the epoxy-amine, and FIG. 2b shows that the composition I1 of the invention which is obtained by extrusion, has the epoxy-amine dispersed in the form of nodules having a size that varies between 600 nm and 5 µm approximately, i.e. a number-average size of the nodules of less than 5 µm with a maximum standard deviation of 0.5 µm.

Rheology measurements (via a frequency sweep at 200° C.) have furthermore shown a slight modification of the viscosity of the polyethylene by the discontinuous reinforcing phase.

As regards the average shear rate γ used in this example, it was around 1200 s$^{-1}$.

2) Reinforcement of a Polypropylene by an Epoxy Resin with Optional Amine, and by a PDMS-SiH (See FIGS. 3-6)

Table 5 below shows tests with three compositions I12, I13 and I14 according to said first embodiment of the invention, based on a polypropylene of tradename PPH 3060, in comparison with a control T2 consisting solely of this polypropylene.

Figure 3:
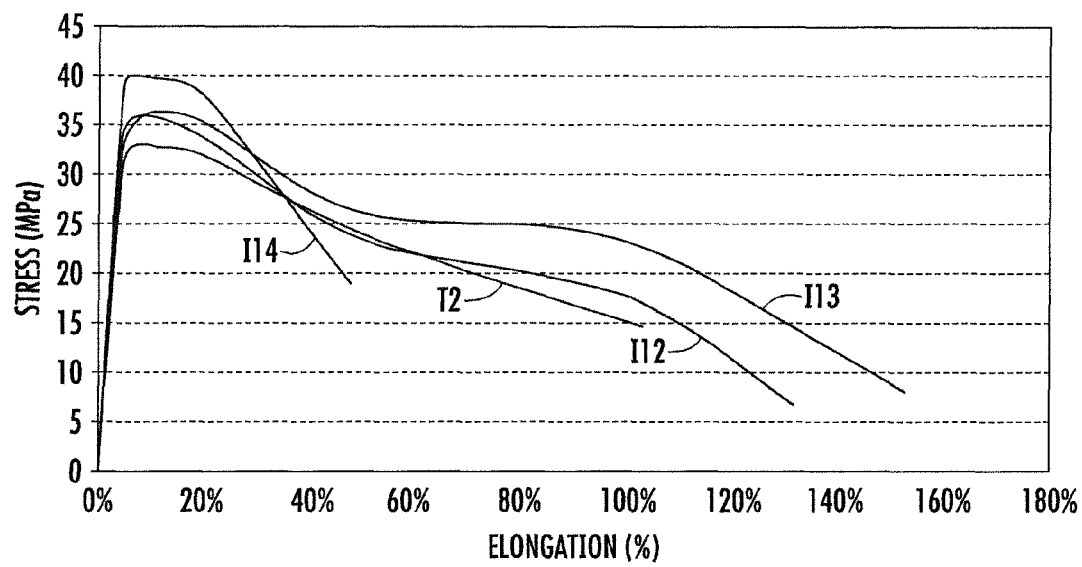
FIG. 3 is a stress-elongation graph showing three curves of extruded compositions according to the first embodiment of the invention based on a polypropylene and on an epoxy resin with an amine crosslinking agent, and a control curve relating to this polypropylene alone.

This table 5 shows an improvement in the elongation at break, in the yield stress and in the tensile moduli for only 1.75 parts by weight of epoxy-amine, as illustrated in FIG. 3.

Figures 4A, 4B, 4C:
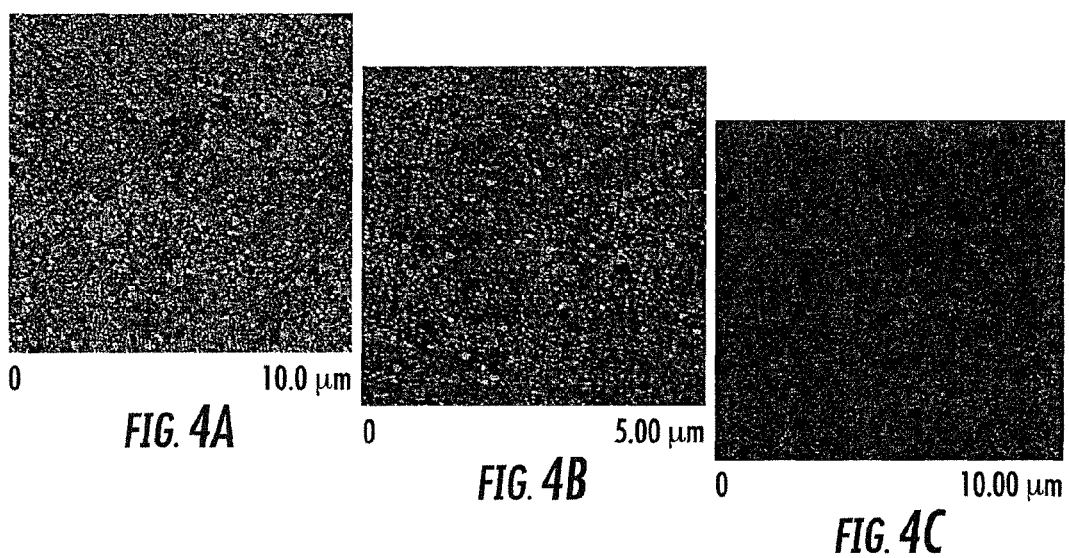
FIGS. 4a, 4b and 4c are three atomic force microscope images showing the morphology of three extruded compositions according to this first embodiment, all three based on a polypropylene and on an epoxy resin with or without amine crosslinking agent and that are obtained, respectively, with 3.5 parts by weight of epoxy-amine, 2.5 parts of epoxy and 35 parts of epoxy-amine.

As regards the morphology of such compositions based on polypropylene reinforced with an epoxy resin, it is illustrated in FIGS. 4a (with 3.5 parts by weight of epoxy-amine), 4b (with 2.5 parts by weight of epoxy resin) and 4c (with 35 parts by weight of epoxy-amine), which show the homogeneous dispersion of the epoxy resin, alone or cross-linked, in the form of nodules having a size ranging from 100 nm to around 3 µm, i.e. a number-average size of the nodules of less than 3 µm with a maximum standard deviation of 0.5 µm.

TABLE 5

|  | T2 | I12 | I13 | I14 |
|---|---|---|---|---|
| PPH3060 | 100 | 100 | 100 | 100 |
| PO 1020 |  |  |  | 1 |
| DER331 |  | 2.5 | 1.25 | 5 |
| Jeffamine T403 |  | 1 | 0.5 | 2 |
| SHORE D HARDNESS Pt (3s) | 67 | 67 | 67 | 67 |
| TENSION stress at break, |  |  |  |  |
| average, MPa | 14.5 | 6.5 | 5.1 | 18.9 |
| standard deviation | 1.8 | 0.8 | 1.6 | 0.6 |
| elongation at break, |  |  |  |  |
| average, % | 103 | 132 | 195 | 48 |
| standard deviation | 13 | 11 | 6 | 1 |
| yield stress, |  |  |  |  |
| average, MPa | 32.7 | 36 | 35.7 | 40 |
| standard deviation | 0.1 | 2 | 0.9 | 0.2 |
| elongation at yield, |  |  |  |  |
| average, % | 1 | 9 | 12 | 7 |
| standard deviation |  | 2 | 1 | 0 |
| 5% modulus | 32.0 | 35.1 | 31.6 | 39.6 |
| 10% modulus | 33.0 | 35.9 | 35.5 | 39.7 |
| 20% modulus | 32.0 | 33.9 | 34.8 | 38.0 |
| 50% modulus | 24.0 | 23.5 | 25.7 |  |
| 100% modulus | 18.0 | 17.6 | 23.4 |  |

Figure 5:
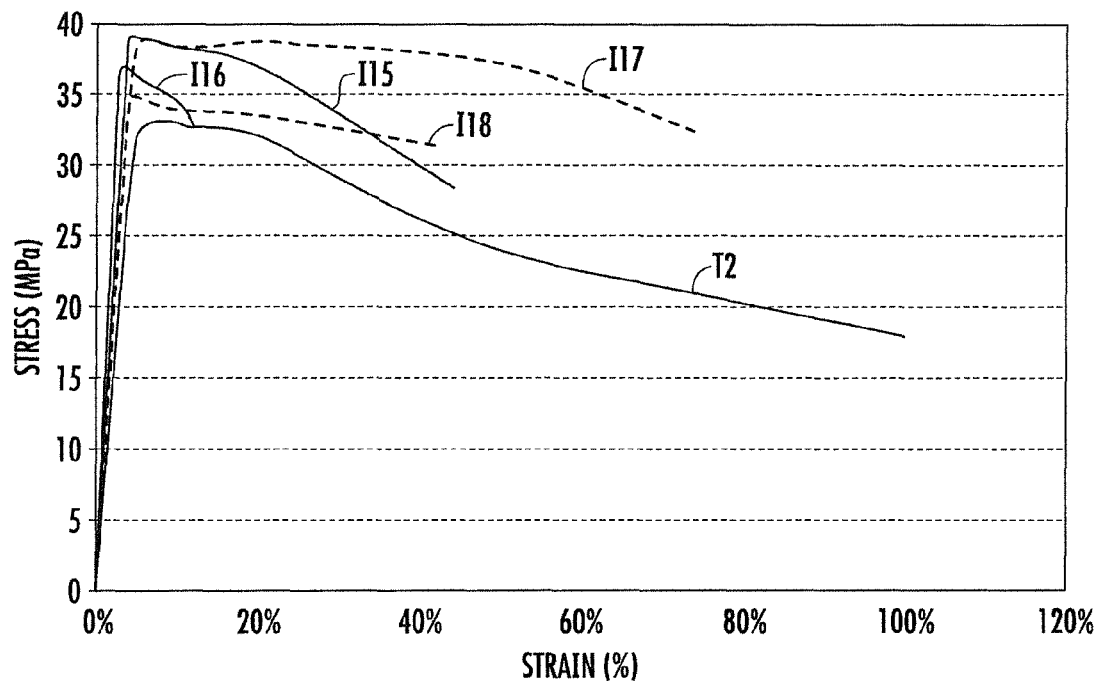
FIG. 5 is a stress-elongation graph showing, in comparison to the control curve from FIG. 3 relating to polypropylene, four curves of extruded compositions according to the first embodiment of the invention based on this polypropylene and on an epoxy-amine, among which two curves (respectively with 14 and 28 parts by weight of epoxy-amine) show the influence of a compatibilizing agent formed of a maleic anhydride-grafted polypropylene (1 part by weight each time) and two other curves show the influence of a post-curing in addition to this same compatibilizing agent and to these two amounts of epoxy-amine.

The graph from FIG. 5 shows the influence of a post-curing for 3 h at 120° C. and of a compatibilization on four other compositions according to the invention I15, I16, I17 and I18, all based on the same PPH 3060 polypropylene, and the same epoxy-amine and comprising, in addition, 1 part by weight of a maleic anhydride-grafted polyolefin (PO 1020), in comparison with the control composition T2 (I15 and I17 comprise 14 parts by weight of epoxy-amine with a post-cure for I17 only, and I16 and I18 comprise 28 parts by weight of epoxy-amine with a post-cure for I18 only). An improvement in the mechanical properties via addition of this compatibilizing agent and via this post-curing is observed, with a displacement of the yield (in stress and in strain), and an increase in the Young's modulus, which shows a significant impact of the compatibilizing agent and of the post-curing.

Measurements have furthermore been carried out that show the influence of the extrusion profile on a PPH 3060+1 part by weight of PO 1020+7 parts by weight of epoxy-amine formulation, which showed, in terms of stress-elongation curves, the superiority of the P10 screw profile relative to the P9 screw profile as regards the improvement of the yield stress.

As illustrated in FIG. 6, creep tests relating to the composition I12 and to another composition I19 (according to the second embodiment of the invention, being reinforced by 1 part by weight of H-siloxane), in comparison with the control composition T2 and with another control composition T3 (PPH+30% of glass fibers), showed that the creep strain of compositions I12 and I19 is divided by a factor of 7 at 100° C. relative to that of the composition T2 and is comparable to that of the composition T3.

Regarding the rheology measurements carried out on these compositions according to the invention, they reveal a slight modification of the viscosity of the reinforced PPHs.

As regards the average shear rate γ used in this example, it was around 1200 s$^{-1}$.

3) Reinforcement of a TPU by an Epoxy Resin with Optional Amine, by a PDMS-SiH and by an MDI (See FIGS. 7-10b)

Table 6 below gives tests carried out on three other compositions I20, I21 and I22 based on a TPU according to the first embodiment of the invention (I20 comprising 5 parts by weight of an epoxy resin and I21 additionally 2 parts by weight of an amine, i.e. 7 parts by weight of an epoxy-amine) and also according to the second embodiment of the invention for I22 (which contains 1 part by weight of H-siloxane), in comparison with a control composition T4 consisting of this TPU alone.

TABLE 6

|  | T4 | I20 | I21 | I22 |
|---|---|---|---|---|
| Desmopan 487 | 100 | 100 | 100 | 100 |
| H-siloxane |  |  |  | 1 |
| DER330 |  | 5 | 5 |  |
| Jeffamine T403 |  |  | 2 |  |
| Total parts |  | 105 | 107 | 101 |
| DENSITY g/cm$^3$ | 1.19 | 1.19 | 1.19 | 1.19 |
| TENSION stress at break, | 500 mm/min | | | |
| average, MPa | 21.7 | 27.2 | 18.4 | 30.7 |
| standard deviation | 1.1 | 3.3 | 0.1 | 1.5 |
| elongation at break, |  |  |  |  |
| average, % | 616% | 606% | 277% | 481% |
| standard deviation | 34% | 42% | 34% | 24% |
| MODULI | 0 | 0 | 0 | 0 |
| 5% modulus | 1.3 | 1.2 | 1.2 | 1.3 |
| 10% modulus | 2.2 | 2 | 2.4 | 2.1 |

TABLE 6-continued

|  | T4 | I20 | I21 | I22 |
|---|---|---|---|---|
| 20% modulus | 3.4 | 3 | 5.5 | 3.2 |
| 50% modulus | 4.8 | 4.4 | 10.6 | 4.8 |
| 100% modulus | 5.6 | 5.3 | 14.3 | 6 |
| 200% modulus | 7.1 | 6.8 | 17.6 | 8.2 |

Figure 7:
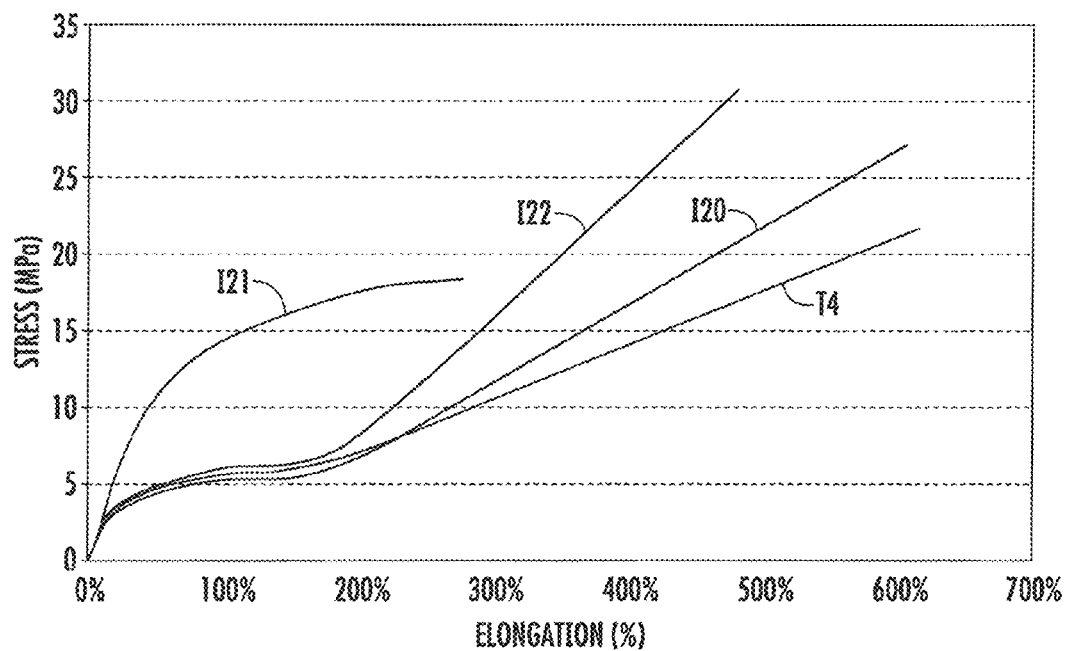
FIG. 7 is a stress-elongation graph showing three curves of extruded compositions according to the first and second embodiments of the invention, all three based on a TPU, the first incorporating an epoxy resin, the second an epoxy-amine and the third a PDMS-SiH, and a control curve relating to this TPU alone.

This table shows an increase of the stress at break, of the moduli, of the elongation at break, and erasure of the yield point by incorporation under shear according to the invention of epoxy, epoxy-amine or a polyhydropolydimethylsiloxane (see FIG. 7).

Figure 8A:
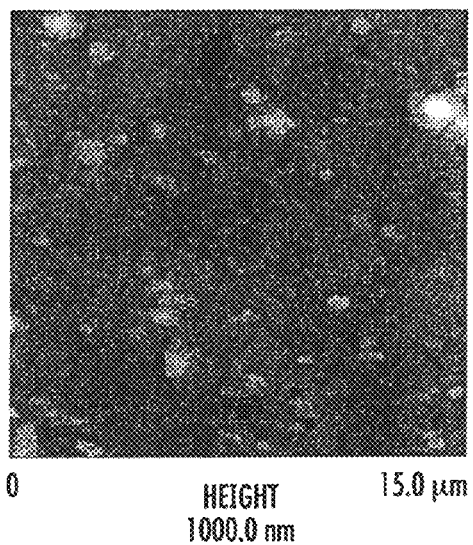
FIGS. 8a and 8b are two atomic force microscope images of different phases showing the morphology of a composition based on a TPU according to this first embodiment incorporating an epoxy-amine.
Figure 8B:
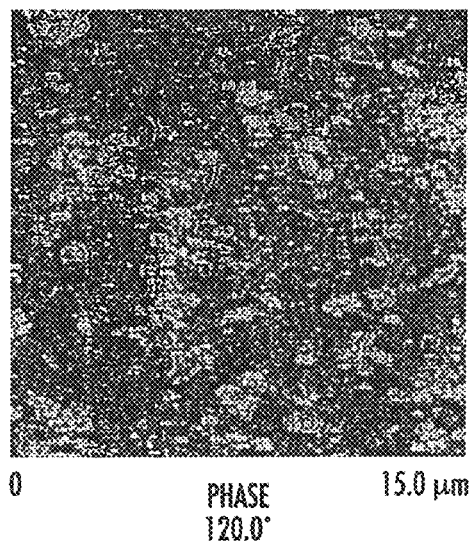
Figure 9:
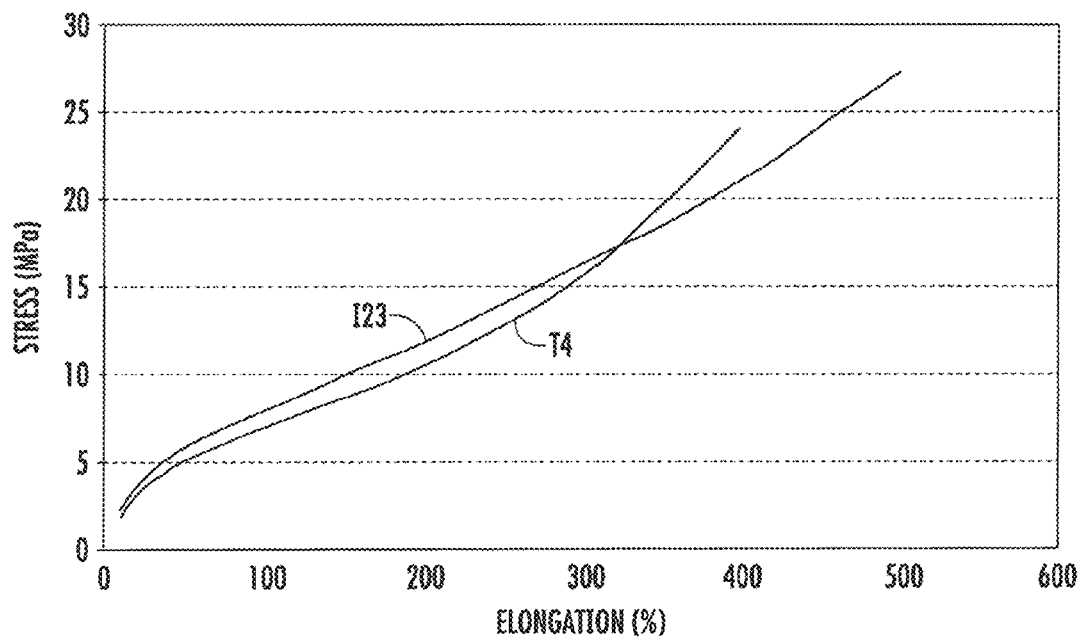
FIG. 9 is a stress-elongation graph showing a curve of a composition obtained in an internal mixer based on a TPU but reinforced according to the third embodiment of the invention with an MDI, in comparison with a control curve relating to this TPU alone.
Figure 10A:
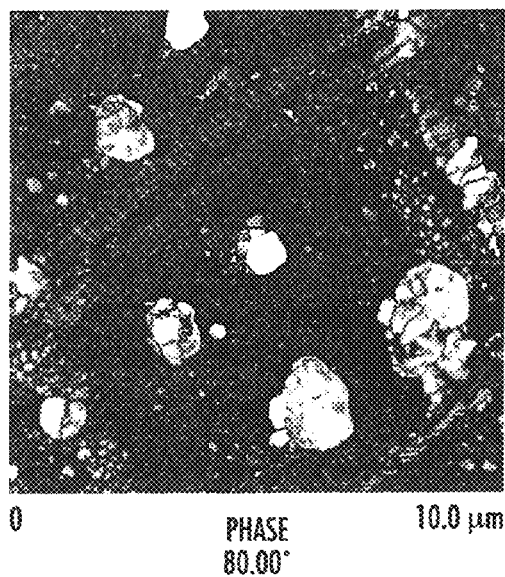
FIGS. 10a and 10b are two atomic force microscope images of different phases showing the morphology of this composition based on a TPU and on an MDI according to this third embodiment.
Figure 10B:
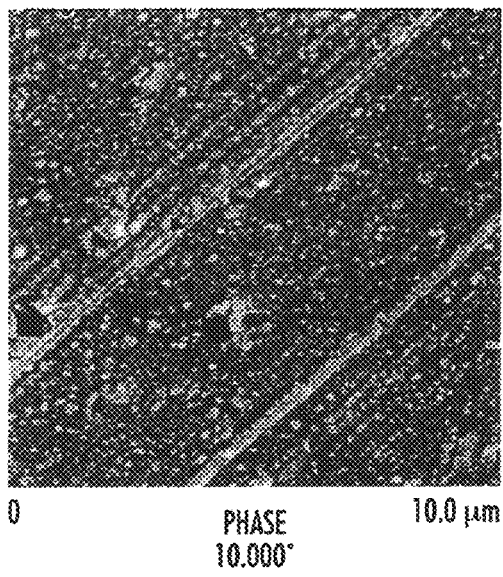

As regards the morphology that can be seen in FIGS. 8a and 8b, it reveals a dispersion of the epoxy-amine of the composition I21 in the form of nodules having a number-average size of less than 3 μm, with a maximum standard deviation of 0.5 μm.

Regarding the dynamic properties of these compositions I20 to I22, a significant shift in the transition temperature Tg, and also a substantial increase in the elastic modulus between 50° C. and 150 C, a significant broadening of the operating temperature range and of the softening point of the material were measured.

An increase in the viscosity of the TPU by the reinforcing polymers of the compositions I20 to I22 was furthermore demonstrated.

Tests were also carried out (see table 7 below and FIG. 9) with another composition I23 according to the third embodiment of the invention (the dispersed morphology of which can be seen in FIGS. 10a and 10b), still in comparison with the control composition T4, which also show an improvement in the aforementioned mechanical properties. This composition I23 was obtained in an internal mixer, by incorporating a polyisocyanate (MDI) into the TPU.

TABLE 7

|  |  | T4 | I23 |
|---|---|---|---|
| TPU Desmopan 487 |  | 100 | 100 |
| MDI "Desmodur 44MCL" |  | — | 5 |
| TOTAL |  | 100 | 105 |
| Thickness | mm | 2.02 | 2.02 |
| Density | — | 1.19 | 1.20 |

TABLE 7-continued

|  |  | T4 | I23 |
|---|---|---|---|
| Shore A hardness 15s | Point | 87 | 87 |
| Stress at break | MPa | 21.7 | 30.3 |
| standard deviation |  | 2.7 | 4 |
| Elongation at break | % | 616 | 545 |
| standard deviation |  | 34 | 36 |
| modulus at 10% | MPa | 2.2 | 2.33 |
| modulus at 20% | MPa | 3.4 | 3.82 |
| modulus at 50% | MPa | 4.8 | 6.01 |
| modulus at 100% | MPa | 5.6 | 7.9 |
| modulus at 200% | MPa | 7.1 | 11.8 |
| Delft tear | N | 85.7 | 109 |
| DRC 22 h at 80° C. | % | 80% | 73% |

Table 8 below gives details of the rheological parameters of this composition I23, comparing them to those of another composition I24 according to the invention which also consists of TPU to which MDI has been added, but which was obtained by twin-screw extrusion.

A slight modification of the rheological properties of the materials is observed. However, these materials still have viscosity parameters similar to those of thermoplastics, and therefore retain the processing properties of these thermoplastics.

TABLE 8

| ARES 180° C. |  | T4 | I23 | I24 |
|---|---|---|---|---|
| K | Pa · s | 120000 | 219900 | 196800 |
| n | — | 0.18 | 0.14 | 0.15 |

As regards the average shear rate γ used in this example, it was around 1700 s$^{-1}$.

4) Reinforcement of a PEBA by an Epoxy Resin with Optional Amine, by a PDMS-SiH and by an MDI (See FIGS. 11-19b)

Tables 9a and 9b below (see FIG. 11 for table 9a) give tests carried out on other extruded compositions I25 to I35 and I33', I33", I33''' according to the first embodiment of the invention, based on a PEBAX 6333 PEBA and on an epoxy-amine, except for the compositions I26, I34 and I33''' based on a non-crosslinked epoxy resin, in comparison with a control composition T5 consisting of this PEBA alone.

TABLE 9a

|  | T5 | I25 | I26 | I27 | I28 | I29 | I30 | I31 | I32 | I33 | I34 | I35 |
|---|---|---|---|---|---|---|---|---|---|---|---|---|
| Pebax 6333 | 100 | 100 | 100 | 100 | 100 | 100 | 100 | 100 | 100 | 100 | 100 | 100 |
| SBM 012 |  |  |  |  |  | 1 |  |  |  |  |  |  |
| MAM |  |  |  |  |  |  |  | 1 | 1 |  |  |  |
| DER331 |  |  | 5 | 5 | 10 |  |  |  |  |  | 20 | 20 |
| DER667 |  |  |  |  |  |  |  |  |  | 15 |  |  |
| Epikote 496 |  |  |  |  |  | 4 | 4 | 4 | 4 |  |  |  |
| Jeffamine T403 |  | 1 |  | 2 | 4 | 2.9 | 2.9 | 2.9 | 2.9 |  |  | 8 |
| Jeffamine T5000 |  |  |  |  |  |  |  |  |  | 8 |  |  |
| DENSITY g/cm$^3$ | 1.01 | 1.02 | 1.02 | 1.02 | 1.02 | 1.02 | 1.02 | 1.02 | 1.02 | 1.03 | 1.03 | 1.05 |
| SHORE D HARDNESS Pt (3s) | 57 | 54 | 53 | 57 |  | 59 | 55 | 59 | 58 | 52 | 46 | 58 |
| TENSION stress at break, |  |  |  |  |  |  |  |  |  |  |  |  |
| average, MPa | 35.7 | 34 | 36.9 | 44.6 | 38 | 43 | 37.7 | 44.9 | 37.9 | 42.2 | 33.6 | 22.2 |
| standard deviation | 3.1 | 0.4 | 0.5 | 2.7 | 1.4 | 0.8 | 3.1 | 0.8 | 2 | 0.8 | 3.8 | 1.4 |
| elongation at break, |  |  |  |  |  |  |  |  |  |  |  |  |
| average, % | 358 | 312 | 424 | 326 | 160 | 95 | 189 | 88 | 166 | 313 | 535 | 38 |
| standard deviation | 17 | 2 | 6 | 18 | 11 | 4 | 21 | 3 | 9 | 11 | 35 | 10 |
| 5% modulus | 11.6 | 12.6 | 11.2 | 15.1 | 16.1 | 16.1 | 13 | 17.7 | 15.1 | 11.4 | 8.1 | 16 |

TABLE 9a-continued

|  | T5 | I25 | I26 | I27 | I28 | I29 | I30 | I31 | I32 | I33 | I34 | I35 |
|---|---|---|---|---|---|---|---|---|---|---|---|---|
| 10% modulus | 15 | 16.2 | 14.6 | 19.1 | 20.4 | 22.4 | 17.6 | 24.4 | 20 | 15.6 | 11 | 19.9 |
| 20% modulus | 17.5 | 19 | 17.4 | 22.4 | 24.3 | 28.9 | 21.7 | 31.2 | 24.4 | 19.1 | 13.3 | 22.1 |
| 50% modulus | 18.2 | 20.3 | 18.4 | 25.1 | 28.4 | 37.3 | 25.9 | 40.6 | 28.9 | 21.9 | 14.5 |  |
| 100% modulus | 19.1 | 21.7 | 19.2 | 28.9 | 33.6 |  | 30.9 |  | 33.8 | 25 | 14.7 |  |
| 200% modulus | 23.8 | 27.7 | 23 | 38.1 |  |  |  |  |  | 32.9 | 16.2 |  |

(improved properties with respect to the control T5 are indicated in bold)

This table 9a shows an improvement in the following mechanical properties: increase of the stress at break, of the moduli, of the elongation at break, and erasure of the yield point by incorporation under shear of epoxy or of epoxy-amine.

Table 9b below gives tests carried out, in comparison with the same control composition T5, with other compositions according to the invention I33', I33" and I33'" which are variants of the composition I33. The respective formulations of these three variants were the following:

I33': PEBA+epoxy+1 stoichiometric equivalent of amine crosslinker,
I33": PEBA+epoxy+½ stoichiometric equivalent of amine crosslinker, and
I33'": PEBA+epoxy and with no amine crosslinker.

TABLE 9b

|  | T5 | I33' | I33" | I33'" |
|---|---|---|---|---|
| Pebax 6333 | 100 | 100 | 100 | 100 |
| DER 667 |  | 15 | 15 | 15 |
| Jeffamine T403 |  | 0.68 | 0.34 |  |
| Total parts | 100 | 115.68 | 115.34 | 115.00 |
| DENSITY g/cm³ | 1.01 | 1.03 | 1.03 | 1.04 |
| SHORE D HARDNESS Pt (3s) | 57 | 59 | 59 | 58 |
| TENSION stress at break, |  |  |  |  |
| average, MPa | 35.7 | 38.9 | 37.7 | 33 |
| standard deviation | 3.1 | 0.7 | 0.9 | 0.8 |
| elongation at break, |  |  |  |  |
| average, % | 358% | 319% | 332% | 336% |
| standard deviation | 17% | 7% | 10% | 12% |
| 0 | 0 | 0 | 0 | 0 |
| 5% modulus | 11.6 | 17.2 | 15.8 | 15.1 |
| 10% modulus | 15 | 21.6 | 20.4 | 18.6 |
| 20% modulus | 17.5 | 23.6 | 22.8 | 20.6 |
| 50% modulus | 18.2 | 23.4 | 23 | 20.6 |
| 100% modulus | 19.1 | 24.1 | 23.6 | 21.2 |
| 200% modulus | 23.8 | 28.7 | 27.4 | 24.7 |

This table 9b shows the advantage, for improving the mechanical properties of a composition according to the invention based on a PEBA (see in particular the stress at break of the compositions I33' and I33" and all of the moduli of the compositions I33', I33" and I33'"), of using an epoxy resin alone or else crosslinked stoichiometrically by an amine or else crosslinked non-stoichiometrically by this amine.

As regards the morphology of the two compositions according to the invention I27 (see FIG. 12b: with 7 parts by weight of epoxy-amine) and I36 (see FIG. 12c: reinforced according to the second embodiment of the invention with 1 part by weight of H-siloxane), the presence of nodules, the size of which varies from a few hundred nanometers to a few micrometers, with a number-average size of less than 5 μm for a standard deviation of 0.5 μm at most, can be noted in both these cases. In view of these images and of the aforementioned mechanical properties, it is clear that the reinforcing discontinous phase (having a micrometer or even submicron number-average dimension with the aforementioned maximum standard deviation) and the PEBA matrix have a certain cohesion without even the addition of compatibilizing agents, fillers, or other chemical reactants, owing to the aforementioned shear stresses, and screw profiles and temperatures.

Figure 13:
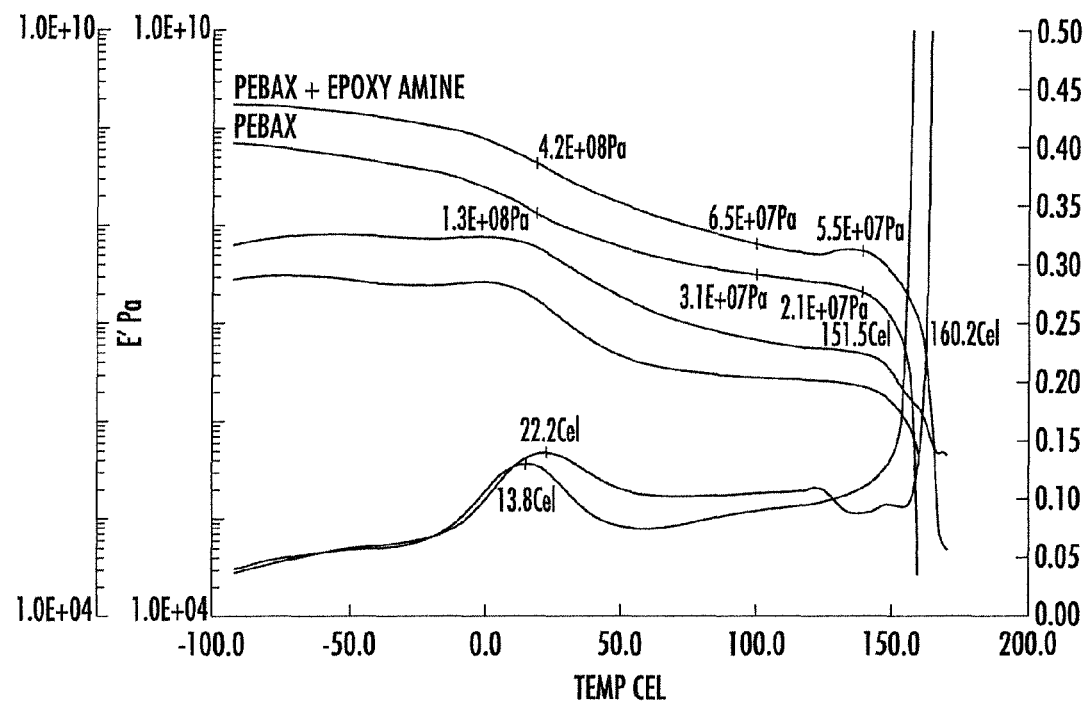
FIG. 13 is a graph showing the increase in the elastic and viscous moduli of PEBA extruded with the epoxy resin and with the epoxy-amine, from −100° C. to 160° C., with modification of the glass transition and increase of the softening point.

As can be seen in FIG. 13, an improvement of the dynamic properties of the PEBA via its reinforcement implemented in the aforementioned compositions has furthermore been demonstrated, that results in an increase in the elastic and viscous moduli over the entire temperature range (from −100° C. to 160° C.), a modification of the glass transition Tg (increase or decrease depending on the nature of the resin), and an increase in the softening point.

As can be seen in the creep strain graph from FIG. 14, a decrease of up to 40% in the creep strain after 100 h at 100° C. (see the composition I29) is obtained.

The impact strength at ambient temperature (normalized Charpy test) was also measured for the compositions according to the invention I25 and I28, as can be seen in table 10 below, which shows a gain of around 7% in the impact strength.

TABLE 10

| Sample | Impact strength acU (kJ/m²) |
|---|---|
| T5 | 130.7 |
| I25 | 138.8 |
| I28 | 139.8 |

Table 11 below (see FIG. 15) gives tests carried out on another extruded composition I36 according to the second embodiment of the invention, based on a PEBAX 6333 PEBA and on a PDMS-SiH of V90 tradename, in comparison with a control composition T6 consisting of this PEBA alone.

TABLE 11

|  | T6 | I36 |
|---|---|---|
| Parts by weight |  |  |
| Pebax 6333 | 100 | 100 |
| V90 |  | 1 |
| INITIAL PROPERTIES | | |
| DENSITY g/cm³ | 1.01 | 1.01 |
| TENSION stress at break, |  |  |
| average, MPa | 35.7 | 42.2 |
| standard deviation | 3.1 | 2 |
| elongation at break, |  |  |
| average, % | 358% | 411% |
| standard deviation | 17% | 20% |

TABLE 11-continued

|  | T6 | I36 |
|---|---|---|
| yeild stress, average, MPa | 17.5 | 20.3 |
|  | 0 | 0 |
| 5% modulus | 11.6 | 15.7 |
| 10% modulus | 15 | 18.7 |
| 20% modulus | 17.5 | 20.3 |
| 50% modulus | 18.2 | 19.9 |
| 100% modulus | 19.1 | 20.2 |
| 200% modulus | 23.8 | 23.3 |

This table 11 shows a gain in yield stress, in stress at break and elongation at break.

Figure 16A:
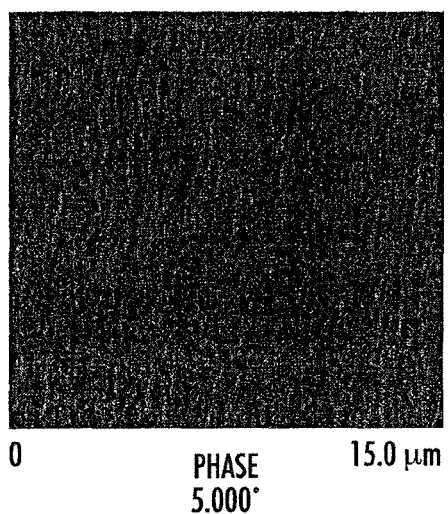
FIGS. 16a and 16b are two atomic force microscope images respectively showing the morphology of the PEBA alone and that of this PEBA extruded and reinforced with this PDMS-SiH.
Figure 16B:
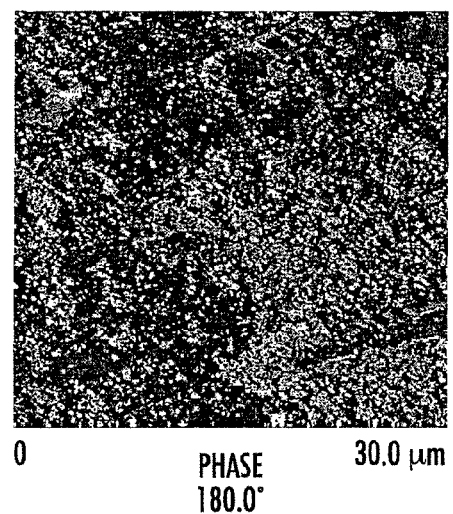

As regards the morphology of this composition I36 according to the invention, which can be seen in FIG. 16b with respect to the control T6 from FIG. 16a, it is characterized by a dispersion, in the PEBA matrix, of the PDMS-SiH reinforcing phase in the form of nodules having a number-average size equal to 1 μm, with a standard deviation of 0.5 μm at most.

Figure 17:
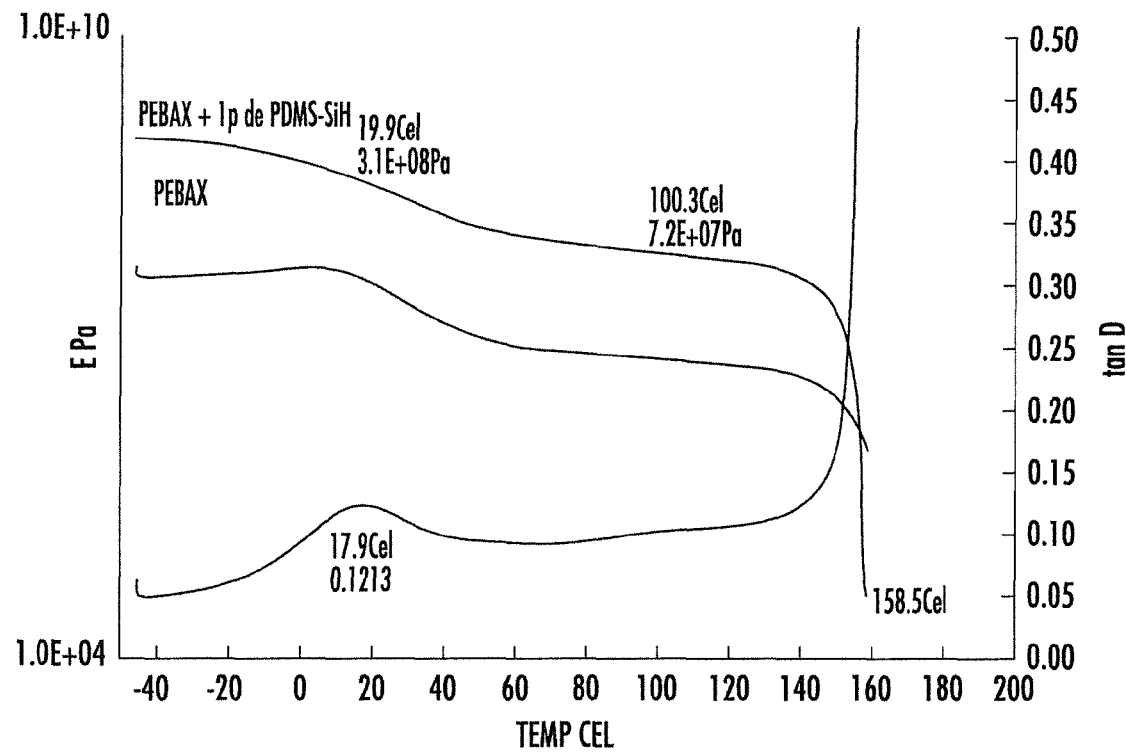
FIG. 17 is a graph showing the increase in the elastic and viscous moduli of the PEBA extruded with this PDMS-SiH, from −40 C to 160° C., with modification of the glass transition and increase of the softening point.
Figure 18:
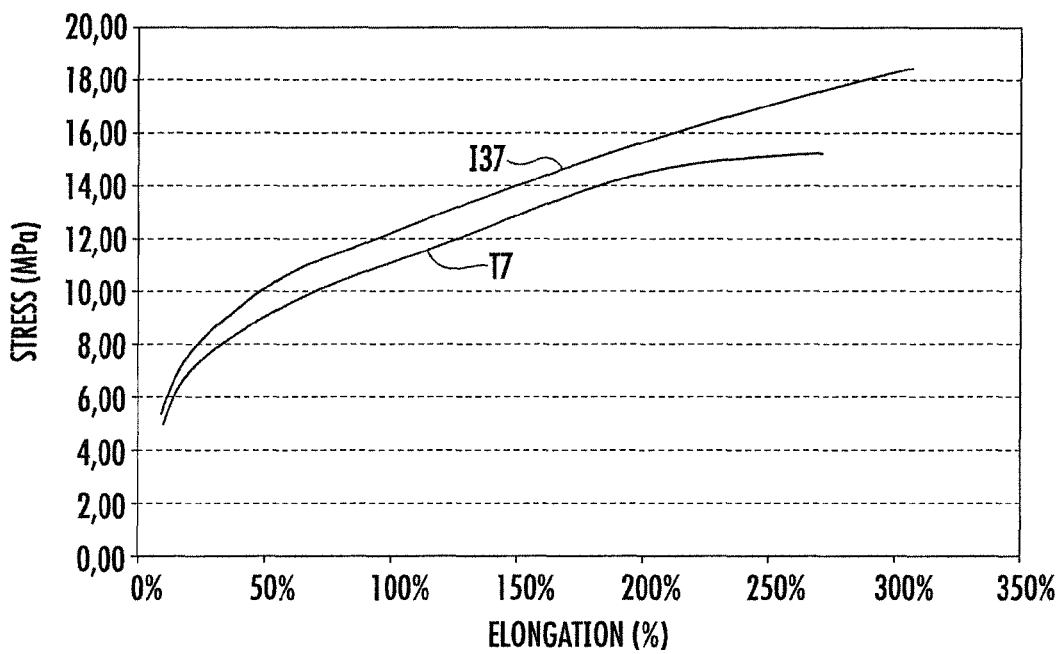
FIG. 18 is a stress-elongation graph showing a curve of an extruded composition based on a PEBA reinforced according to the third embodiment of the invention with an MDI, in comparison with a control curve relating to this PEBA alone.
Figure 21:
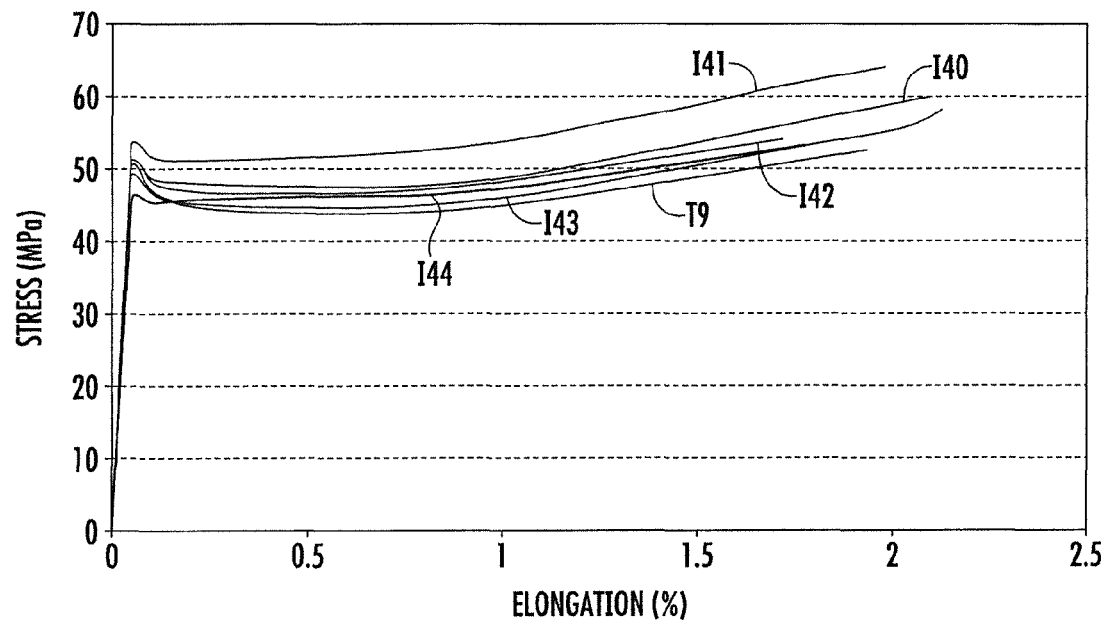
FIG. 21 is a stress-elongation graph showing five curves of extruded compositions according to the invention based on another polyamide PA-6 and reinforced with an epoxy resin, an epoxy-amine or with a PDMS-SiH, in comparison with a control curve relating to this PA-6 alone.

The dynamic properties of this composition I36 that can be seen in FIG. 17 show a net gain in moduli over the entire temperature range, a slight increase in the softening point and an intrinsic modification of the PEBA matrix (shift of the temperature Tg).

Table 12 below (see FIG. 18) gives tests carried out on another extruded composition I37 according to the third embodiment of the invention, based on a PEBAX 6333 PEBA and on an MDI, in comparison with a control composition T7 consisting of this PEBA alone.

TABLE 12

|  |  | T7 | I37 |
|---|---|---|---|
| PEBA |  | 100 | 100 |
| MDI Desmodur 44MCL |  | — | 5 |
| TOTAL |  | 100 | 105 |
| Thickness | mm | 1.96 | 1.99 |
| Density | — | 1.01 | 1.03 |
| Stress at break | MPa | 15.3 | 18.5 |
| standard deviation |  | 0.7 | 0.3 |
| Elongation at break | % | 270 | 306 |
| standard deviation |  | 12 | 21 |
| modulus at 10% | MPa | 4.95 | 5.37 |
| modulus at 20% | MPa | 6.87 | 7.52 |
| modulus at 50% | MPa | 9.01 | 10.04 |
| modulus at 100% | MPa | 11.10 | 12.2 |
| modulus at 200% | MPa | 14.50 | 15.7 |
| Secant modulus at 1% | MPa | 104 | 103 |
| standard deviation | MPa |  | 12 |
| Delft tear | N | 95.7 | 107 |

This table 12 shows a gain in mechanical properties of the composition I37 according to the invention.

As regards the morphology of this composition I37 that can be seen in FIGS. 19a and 19b, it shows the presence of nodules of MDI having a submicron or even nanoscale number-average size (with the aforementioned maximum standard deviation of 0.5 μm).

Table 13 below gives rheology measurements with frequency sweep that are carried out on this composition I37:

TABLE 13

| ARES 180° C. |  | T7 | I37 |
|---|---|---|---|
| K | Pa · s | 6040 | 23212 |
| n | — | 0.65 | 0.5 |

As regards the average shear rate γ used in this example, it was around 1270 s$^{-1}$.

5) Reinforcement of Polyamides (PA-6, PA-11, PA-12) by an Epoxy Resin with Optional Amine and by a PDMS-SiH (See FIGS. 20-25)

Table 14 below (see FIG. 20) gives tests carried out on two other extruded compositions I38 and I39 according to the first embodiment of the invention, based on a PA-6 of Akulon F136 DH tradename and on a DER 331 epoxy resin, the composition I39 also comprising a T403 amine for the reinforcement thereof by an epoxy-amine, in comparison with a control composition T8 consisting of this PA-6 alone.

This table 14 shows an increase of the moduli and of the stresses at break, and also a reduction of the yield point by addition of epoxy and of epoxy-amine.

TABLE 14

|  | T8 | I38 | I39 |
|---|---|---|---|
| PA-6 Alkulon F136DH | 100 | 100 | 100 |
| RESIN DER 331 |  | 0.5 | 0.5 |
| AMINE T403 |  |  | 0.2 |
| SHORE D HARDNESS Pt (3s) | 78 | 75 | 75 |
| TENSION Stress at break, |  |  |  |
| average, MPA | 53.7 | 57.4 | 56.4 |
| standard deviation | 2.6 | 1.6 | 0.8 |
| Elongation at break, |  |  |  |
| average, % | 222 | 199 | 198 |
| standard deviation | 25 | 7 | 6 |
| yield stress, |  |  |  |
| average, MPa | 55.1 |  | 59.3 |
| standard deviation | 1.3 |  | 0.8 |
| Modull |  |  |  |
| 5% modulus | 51.4 | 49.9 | 57.4 |
| 10% modulus | 50.4 | 49.4 | 54.8 |
| 20% modulus | 49.3 | 50.6 | 54.3 |
| 50% modulus | 45.1 | 50.4 | 52.2 |
| 100% modulus | 45 | 51.9 | 53.9 |
| 200% modulus | 48.5 |  |  |

Table 15 below (see FIG. 21) gives tests carried out on five other extruded compositions I40 to I44 according to the invention, all based on a PA-6 of Zytel BM 7300 tradename, in comparison with a control composition T9 consisting of this PA-6 alone. More specifically, the compositions I40 and I41 are reinforced, at varying contents, with the DER 330 epoxy resin alone, the composition I42 with an epoxy-amine based on this resin crosslinked with an amine and the compositions I43 and I44 with H-siloxane (i.e. PDMS-SiH).

This table 15 shows a gain in elongation and in stress at break, and also in moduli and in modification of the yield point for these compositions of the invention, with respect to the control T9.

TABLE 15

|  | T9 | I40 | I41 | I42 | I43 | I44 |
|---|---|---|---|---|---|---|
| Zytel BM7300 | 100 | 100 | 100 | 100 | 100 | 100 |
| H-siloxane |  |  |  |  | 1 | 0.5 | 1.5 |

TABLE 15-continued

|  | T9 | I40 | I41 | I42 | I43 | I44 |
|---|---|---|---|---|---|---|
| DER330 |  | 0.25 | 0.75 | 0.5 |  |  |
| Jeffamine T403 |  |  |  | 0.2 |  |  |
| TENSION stress at break, |  |  |  |  |  |  |
| average, MPa | 52.6 | 60 | 64.1 | 54.1 | 54.9 | 58.2 |
| standard deviation | 4.7 | 1.8 | 2.7 | 2.2 | 1.9 | 3.6 |
| elongation at break, |  |  |  |  |  |  |
| average, % | 194% | 211% | 199% | 172% | 196% | 213% |
| standard deviation | 5 | 12% | 8% | 8% | 24 | 6% |
| Moduli | 0 | 0 | 0 | 0 | 0 | 0 |
| 5% modulus | 50 | 50.4 | 53.4 | 50.8 | 49 | 45.9 |
| 10% modulus | 46.6 | 48.6 | 51.5 | 48 | 46.5 | 45.2 |
| 20% modulus | 44.8 | 48 | 51.1 | 46.9 | 45.2 | 45.7 |
| 50% modulus | 43.9 | 47.6 | 51.7 | 46.6 | 44.6 | 46.2 |
| 100% modulus | 45 | 48.8 | 53.9 | 48.3 | 46 | 47.3 |
| 200% modulus |  | 58.9 |  |  |  | 55.3 |

Figure 22:
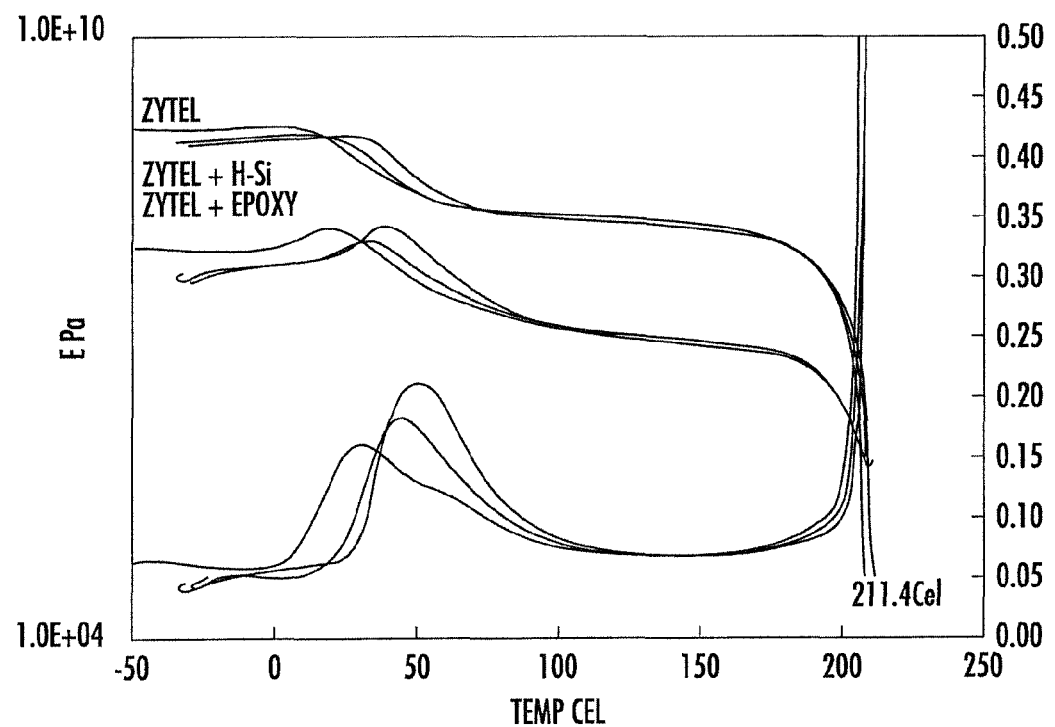
FIG. 22 is a graph showing the increase of the elastic and viscous moduli of these compositions based on PA-6 and on epoxy-amine or else on PDMS-SiH, from −40° C. to 200° C., with modification of the glass transition and increase of the softening point.

Regarding the dynamic properties of these compositions I40 to I44 according to the invention, FIG. 22 shows an intrinsic modification of the polyamide PA-6 both for the use of epoxy resin and of PDMS-SiH as reinforcing polymer, with a substantial increase in the glass transition temperature Tg, in particular for the samples of the compositions I41 and I43.

Table 16 below and the corresponding FIG. 23 show the substantial decrease obtained for the creep strain (after 20 hours under 15 MPa of stress and at 100° C.) with respect to this control composition T9 and to another control composition T10 based on this same Zytel BM 7300 PA-6, but reinforced with 15% of glass fibers (which is the prior art reference for minimized creep):

- of another composition I45 according to the invention based on this same PA-6 and only 0.5 part by weight of epoxy-amine (i.e. 0.4 part of DER 331 resin and 0.1 part of Jeffamine T403); and
- of another composition I46 according to the invention based on this same PA-6 but reinforced with 1 part by weight of PDMS-SiH.

TABLE 16

|  | Creep strain after 20 h | Gain in creep strain | Parts by weight of renforcement | Gain in creep/parts by weight of renforcement |
|---|---|---|---|---|
| T9 | 6.9 | — | — | — |
| T10 | 0.64 | 6.26 | 15 | 0.42 |
| I45 | 5.3 | 1.6 | 0.5 | 3.20 |
| I46 | 3.13 | 3.77 | 1 | 3.77 |

Figure 24:
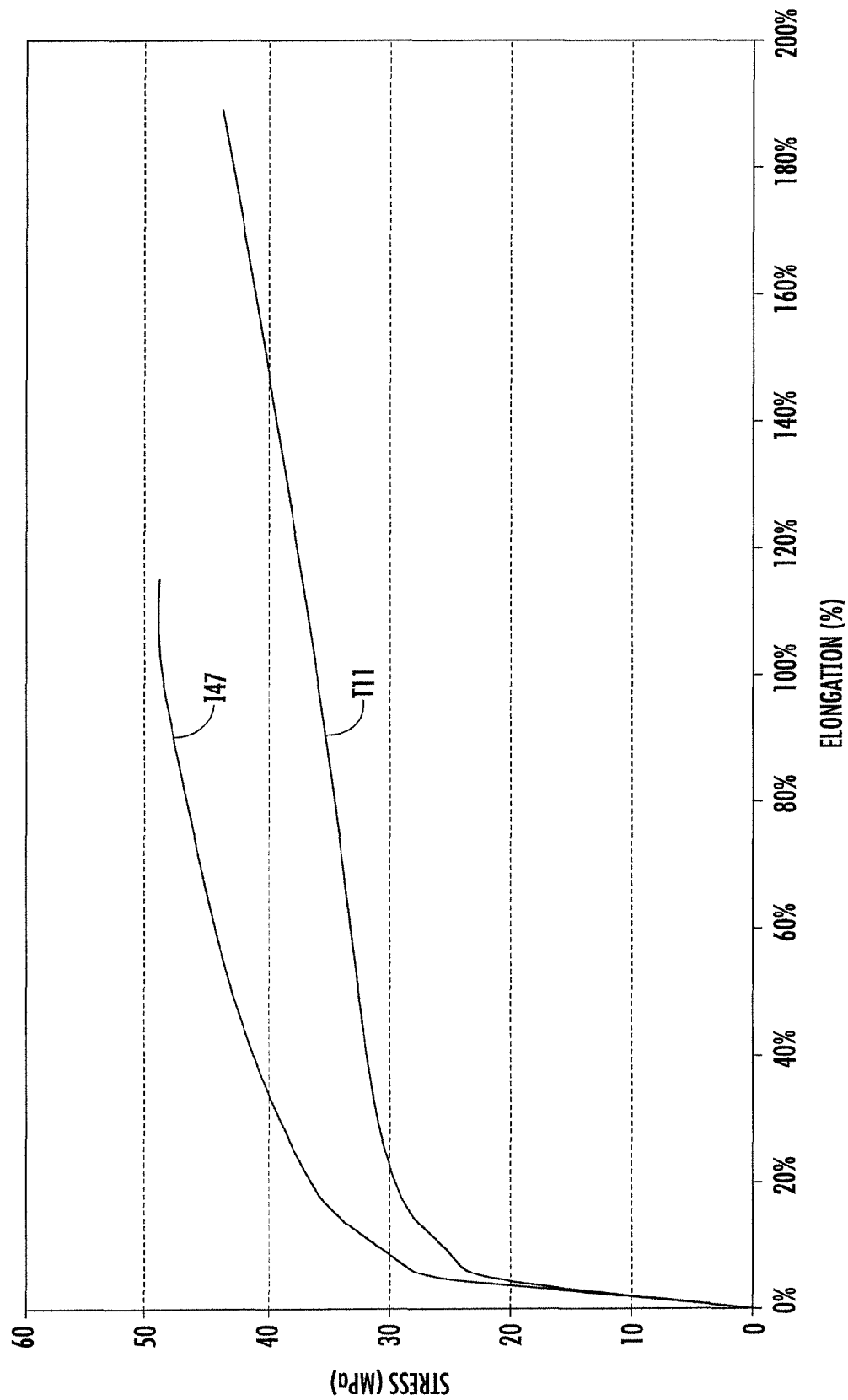
FIG. 24 is a stress-elongation graph showing a curve of an extruded composition according to the invention based on a polyamide PA-11 and reinforced with an epoxy resin, in comparison with a control curve relating to this PA-11 alone.

FIG. 24 gives tests carried out on another composition I47 extruded according to the invention (with a pressure greater than 150 bar) based on a PA-11 of Rilsan BESN P210TL tradename and reinforced with 1 part by weight of a DER 331 epoxy resin, in comparison with a control composition T11 consisting of this PA-11 alone. This FIG. 24 shows the mechanical superiority of this composition I47 reinforced according to the first embodiment of the invention.

Figure 25:
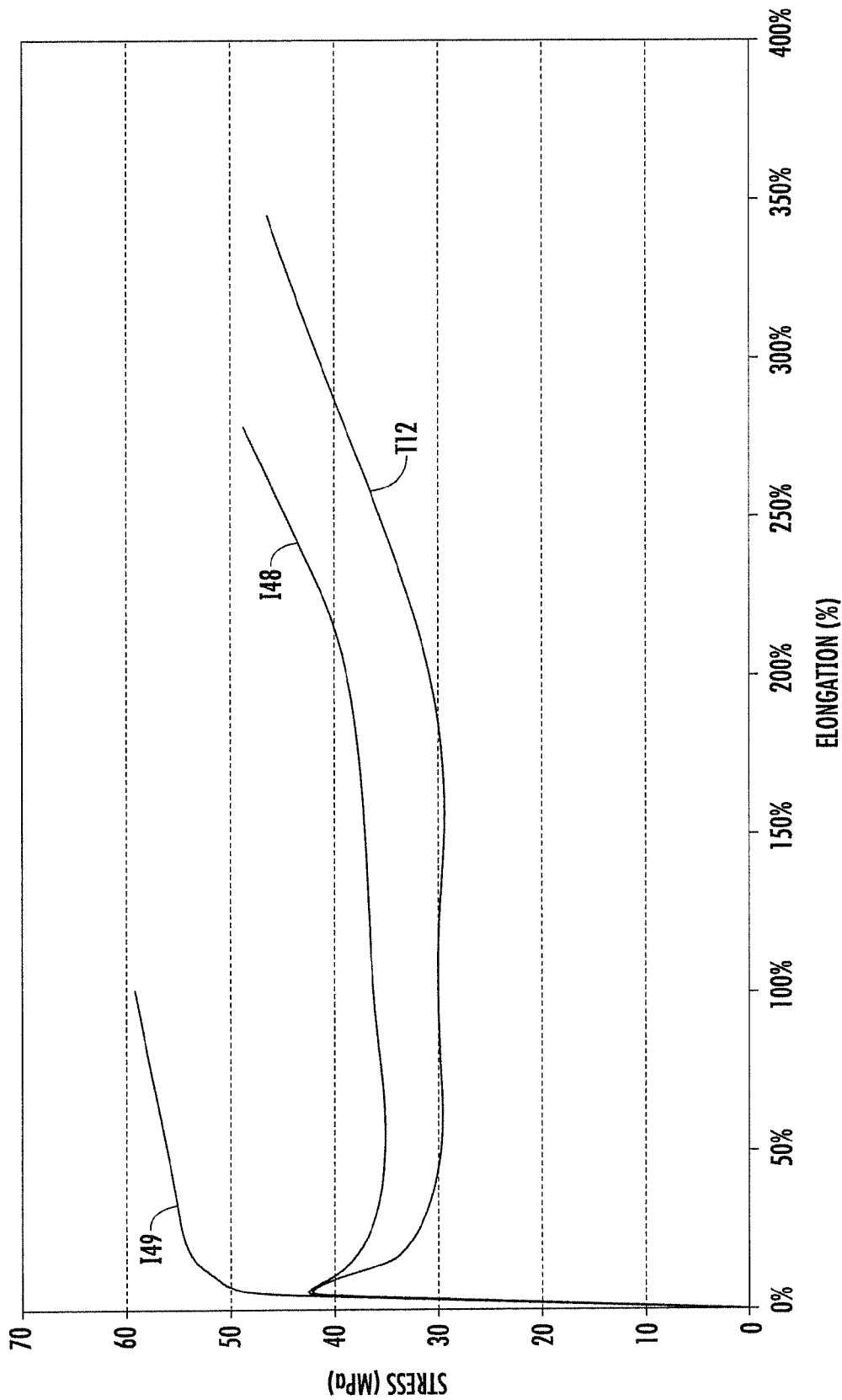
FIG. 25 is a stress-elongation graph showing two curves of extruded compositions according to the invention based on a polyamide PA-12 and reinforced with an epoxy resin present in 1 and 2 parts by weight, respectively, in comparison with a control curve relating to this PA-12 alone.

FIG. 25 gives tests carried out on two other compositions I48 and I49 extruded according to the invention (with a pressure greater than 200 bar) which are both based on a PA-12 of Rilsan AESN P202CTL tradename and reinforced with a DER 331 epoxy resin (I48 and I49 being respectively reinforced with 1 part by weight and with 2.5 parts by weight of this epoxy resin), in comparison with a control composition T12 consisting of this PA-12 alone. This FIG. 25 shows the mechanical superiority of these compositions I48 and I49 reinforced according to the first embodiment of the invention.

As regards the average shear rate γ used in this example, it was around 1690 s$^{-1}$.

6) Reinforcement of a TPU+PEBA Mixture by an Epoxy-Amine and by an MDI (See FIGS. 26-30h)

FIG. 26 gives tests carried out on two compositions I50 and I51 according to the first embodiment of the invention, both based on a 50%/50% mixture of Desmopan 487 TPU+ Peba 4033 PEBA (I50 being reinforced with an epoxy-amine and I51 having the TPU and the PEBA which are each pre-reinforced with this epoxy-amine then mixed), in comparison with a control composition T13 consisting of this TPU+PEBA mixture alone.

This FIG. 26 shows a radical change in the behavior of the TPU+PEBA mixtures reinforced according to the invention, with erasure of the yield point and a substantial increase in the elastic deformation domain.

As regards the morphology of these compositions I50 and I51, it is respectively seen in FIGS. 27b and 27c that it is modified significantly with respect to that of the control T13 from FIG. 27a, in particular with a nanostructuring of the material for the composition I51 where the two constituents of the mixture are pre-reinforced before being mixed.

Figure 28:
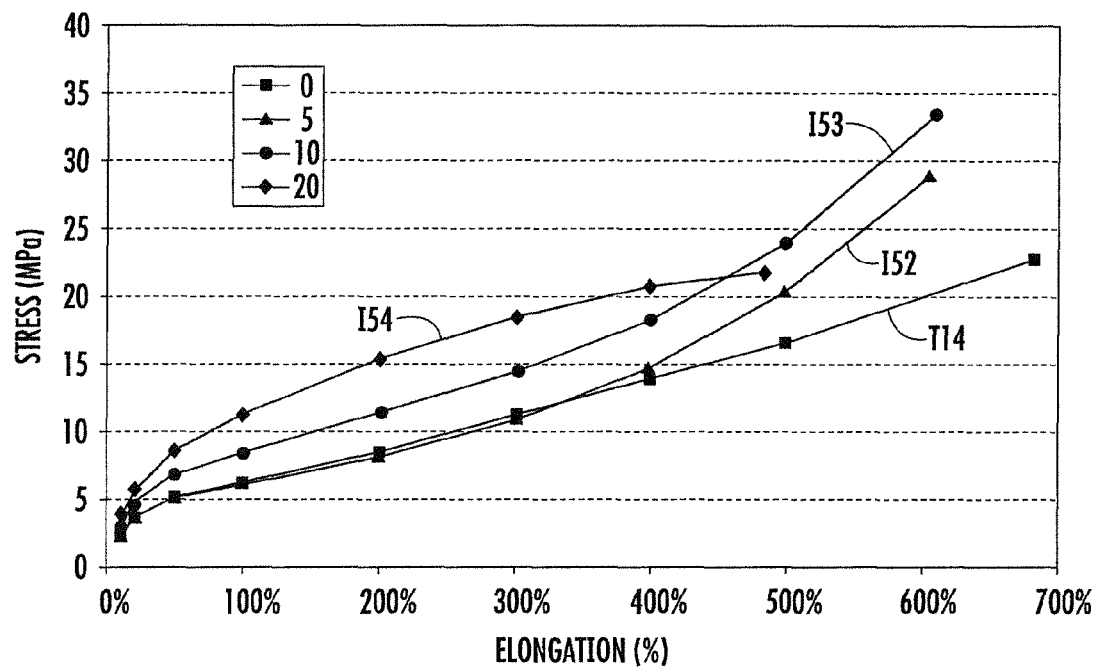
FIG. 28 is a stress-elongation graph showing three curves of extruded compositions according to the invention based on a TPU+PEBA mixture, all three reinforced in situ with an MDI in amounts of 5, 10 and 20 parts by weight, respectively, in comparison with a control curve relating to this unreinforced TPU+PEBA mixture alone.

Table 17 and FIG. 28 give tests carried out on three compositions I52, I53 and I54 according to the third embodiment of the invention which are all three based on a TPU (Desmopan 487)+PEBA (PEBA 4033) mixture, which are filled with talc and which are reinforced by a diisocyanate (Desmodur 44MCL MDI) in amounts respectively equal to 5, 10 and 20 parts by weight, in comparison with a control composition T14 consisting of this TPU+PEBA+talc mixture alone.

This FIG. 28 shows a substantial improvement in the mechanical properties via addition of polyisocyanate, with the reinforcement which can be adjusted by the amount of this polyisocyanate used, this reinforcement being overall even more pronounced when this amount is larger.

TABLE 17

|  |  | T14 | I52 | I53 | I54 |
|---|---|---|---|---|---|
| Desmopan 487 |  | 100 | 100 | 100 | 100 |
| Peba 4033 |  | 5 | 5 | 5 | 5 |
| Talc no. 2 |  | 1 | 1 | 1 | 1 |
| Desmodur 44MCL (MDI) |  | 0 | 5 | 10 | 20 |
| TOTAL |  | 106 | 111 | 116 | 126 |
| MECHANICAL PROPERTIES |  |  |  |  |  |
| Shore A Hardness 15s | Point | 83 | 81 | 88 | 86 |
| Stress at break | MPa | 22.7 | 28.8 | 33.5 | 21.7 |

TABLE 17-continued

|  |  | T14 | I52 | I53 | I54 |
|---|---|---|---|---|---|
| standard deviation |  | 2 | 2.4 | 2.5 | 0.3 |
| Elongation at break | % | 683 | 606 | 610 | 484 |
| standard deviation |  | 57 | 18 | 28 | 15 |
| Modulus E (H1 0 05-0 25% 1 mm/min) | MPa | 21.8 | 22.8 | 29.9 | 42.5 |
| standard deviation | MPa | 1.7 | 0.5 | 1.2 | 1.5 |
| Selft tear | N | 86.6 | 83.2 | 98.9 | 111.4 |
| Zwick rebound (ISO 4662) | % | 52.4 | 44.2 | 42.1 | 38.8 |
| DRC 22 h at 70° C. | % | 60 | 62 | 58 | 66 |
| DRT 22 h at 70° C. (H2 at 25%) | % | 49 | 56 | 57 | 47 |
| Injection | Note/5 | 5 | 5 | 5 | 5 |
| Switching pressure | bar | 900 | 900 | 1150 | 1400 |
| ARES |  |  |  |  |  |
| K (180° C.) | Pa · s | 87170 | 145600 | 156600 | 388700 |
| n (180° C.) | — | — | 0.23 | 0.17 | 0.2 | 0.12 |

Figure 29:
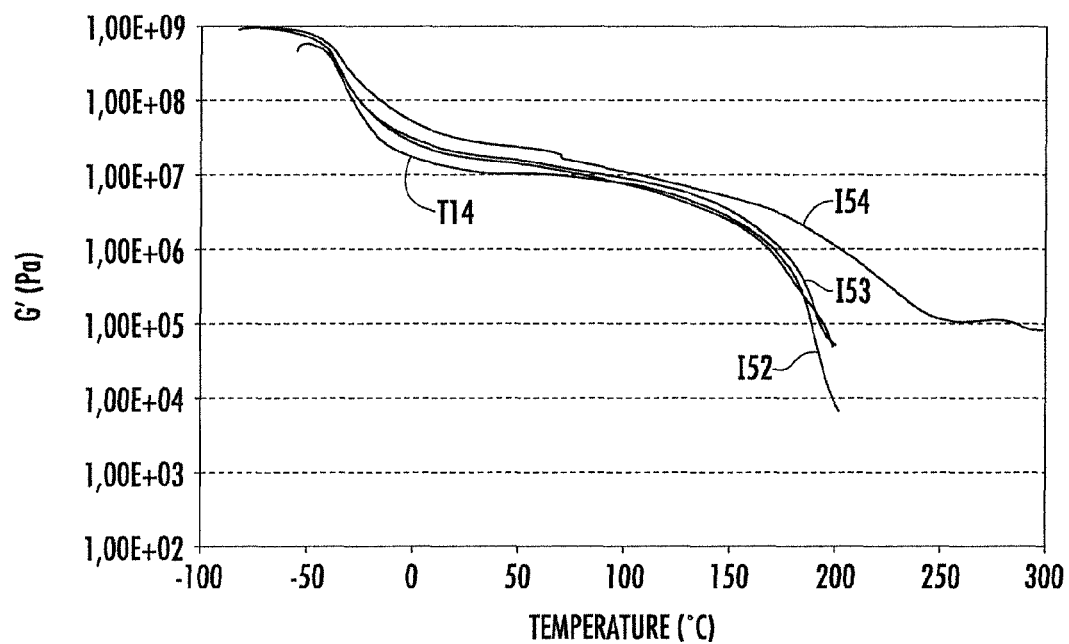
FIG. 29 is an elastic modulus G'-temperature graph showing four curves corresponding respectively to the control TPU+PEBA mixture and to the three compositions according to the invention in question in FIG. 28 reinforced, at variable contents, with MDI.

Furthermore, as the graph from FIG. 29 shows, the dynamic mechanical analysis measurements carried out on these compositions of the invention showed that the addition of this MDI reinforcing agent makes it possible to significantly increase the elastic modulus of compositions I52 to I54 over most of the temperature range, and to very significantly improve the softening point of the material. The range of operating temperatures of the material is thus increased by 100° C.

Figure 30A:
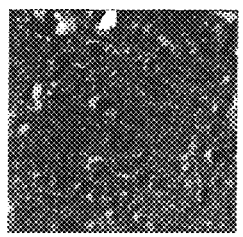
FIGS. 30a and 30b are two atomic force microscope images showing, in different phases, the morphology of the control TPU+PEBA mixture which is in question in FIGS. 28 and 29.
Figure 30B:
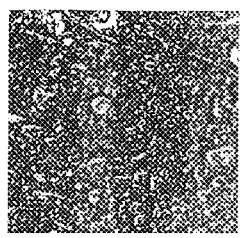
Figure 30C:
FIGS. 30c and 30d are two atomic force microscope images showing, in different phases, the morphology of the first TPU+PEBA composition reinforced with 5 parts of MDI.
Figure 30D:
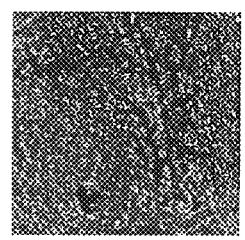
Figure 30E:
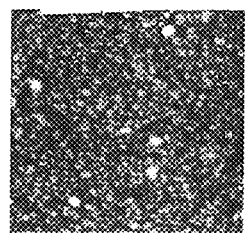
FIGS. 30e and 30f are two atomic force microscope images showing, in different phases, the morphology of the second TPU+PEBA composition reinforced with 10 parts of MDI.
Figure 30F:
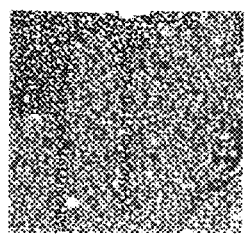
Figure 30G:
FIGS. 30g and 30h are two atomic force microscope images showing, in different phases, the morphology of the third TPU+PEBA composition reinforced with 20 parts of MDI.
Figure 30H:
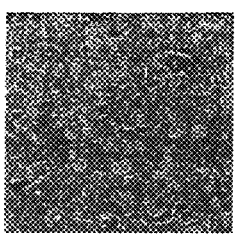

As regards the morphologies of the compositions I52, I53 and I54, FIGS. 30c to 30h which illustrate them show the nodules obtained which are finely and homogeneously dispersed, in comparison with the control T14 from FIGS. 30a and 30b, in particular owing to the very high shear rate used in the extruder and to the specific screw profile used therein.

As regards the average shear rate $\gamma$ used in this example, it was around 1130 s$^{-1}$.

Figure 31:
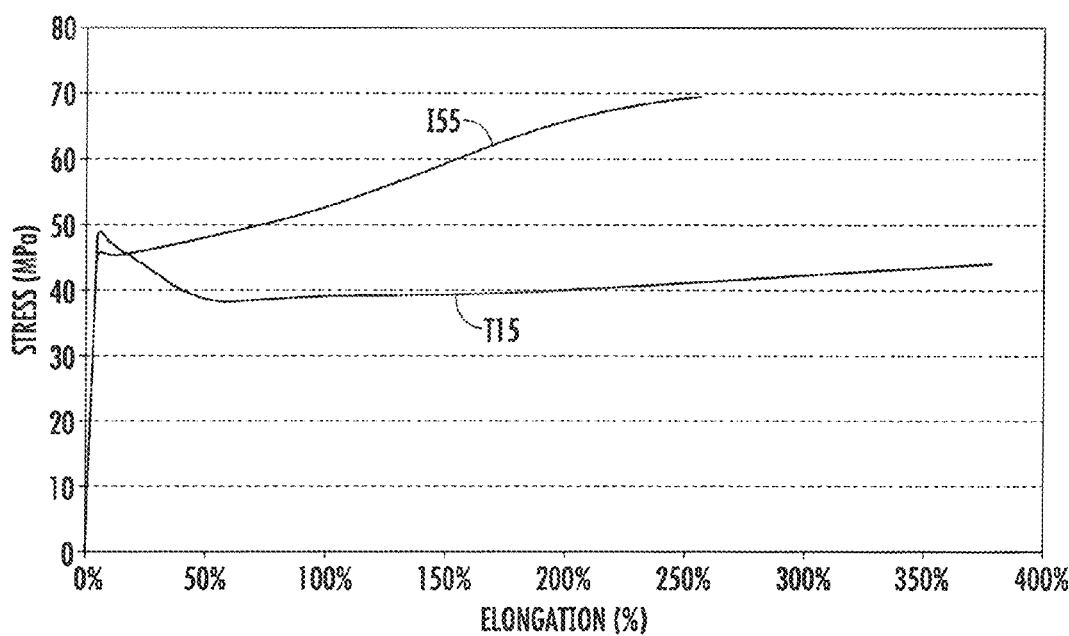
FIG. 31 is a stress-elongation graph showing a curve of extruded composition based on a PA-6+PEBA mixture reinforced according to the invention with an epoxy resin, in comparison with a control curve relating to this unreinforced PA-6+PEBA mixture alone.

7) Reinforcement of a Polyamide (PA-6)+PEBA Mixture by an Epoxy Resin (See FIG. 31)

FIG. 31 gives tests carried out on another composition I55 according to the first embodiment of the invention, based on a PA-6+10% PEBA (Pebax 6333) mixture+2.5 parts by weight of DER 331 epoxy resin, in comparison with a control composition T15 consisting of this PA-6+PEBA (10%) mixture alone.

These tests showed a substantial increase in the stress at break of this composition I55 relative to the control composition T15.

The average shear rate $\gamma$ used in this example was around 1470 s$^{-1}$.

8) Reinforcement of a COPE by an Epoxy Resin with Optional Amine (See FIGS. 32-33b)

Table 18 below and FIG. 32 give tests carried out on three novel compositions according to the invention I56, I57 and I58, all three based on COPE (Arnitel PM460) reinforced by an epoxy-amine, in comparison with a control composition T16 consisting of this COPE alone.

These tests especially show an increase of the hardness, of the stress and elongation at break, and also of the Young's modulus of the compositions I56 and I57 relative to the control composition T16.

TABLE 18

|  | T16 | I56 | I57 | I58 |
|---|---|---|---|---|
| Arnitel PM460 | 100 | 100 | 100 | 100 |
| DER330 |  | 1.25 | 25 | 5 |
| Jeffamine T403 |  | 0.5 | 10 | 2 |
| SHORE D HARDNESS Pt (3s) | 45 | 45 | 50 | 46 |
| TENSION |  |  |  |  |
| stress at break, |  |  |  |  |
| average, MPa | 18.6 | 17.6 | 16.2 | 21 |
| standard deviation | 0.7 | 0.3 | 0.2 | 0.8 |
| elongation at break, |  |  |  |  |
| average, % | 258% | 399 | 89 | 324% |
| standard deviation | 14% | 18 | 15 | 26% |
| Moduli | 0 | 0 | 0 | 0 |
| 5% modulus | 5 | 4.9 | 10.9 | 8.0 |
| 10% modulus | 7.9 | 7.4 | 13.1 | 10.7 |
| 20% modulus | 10.5 | 9.4 | 14.6 | 13.0 |
| 50% modulus | 12.8 | 11 | 15.8 | 14.8 |
| 100% modulus | 14.7 | 12 |  | 16.2 |
| 200% modulus | 18.1 | 14 |  | 18.7 |

FIG. 33b illustrates the morphology obtained with the composition I57 which, in comparison with that obtained with another composition I59 according to the invention based on the same COPE but only reinforced with by 25 parts by weight of the non-crosslinked DER330 epoxy resin alone, shows that this epoxy resin is dispersed in the composition I59 in the form of nodules having a size varying between 100 nm and 3 μm and that, after crosslinking, this resin is present in the composition I57 in the form of nodules having a number-average size of around 5 μm.

Figure 34:
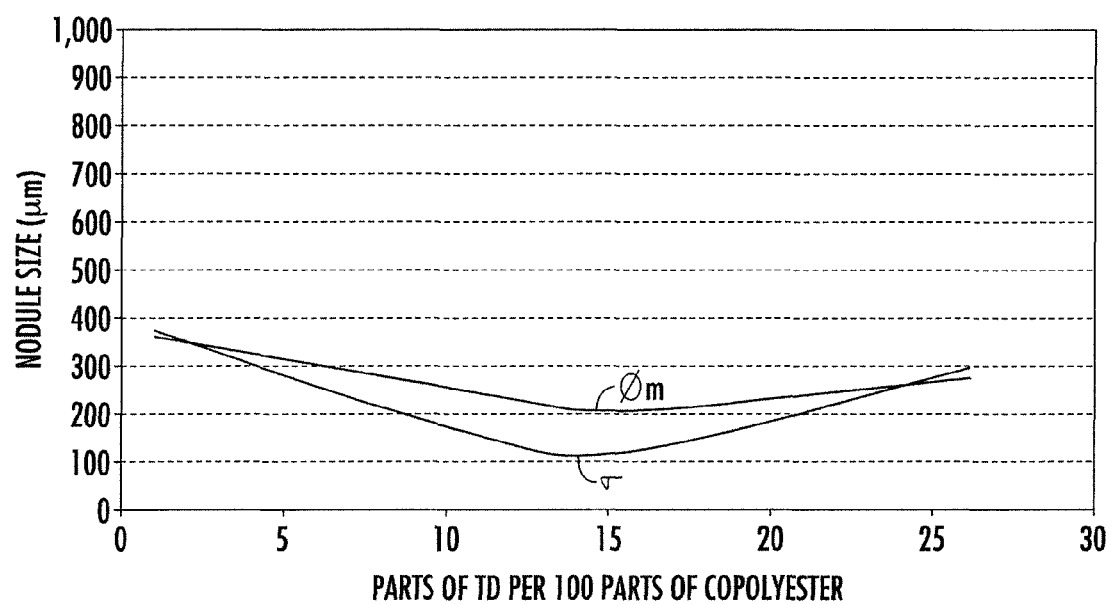
FIG. 34 is a graph illustrating the variation of the size of the nodules of this composition based on a COPE as a function of the amount of epoxy resin used to reinforce this COPE.

Table 19 below and FIG. 34, which is associated therewith, illustrate the variation in the number-average size of the nodules within four compositions I60, I61, I62 and I63 based on this same COPE as a function of the amount of the same epoxy resin used (measurements carried out by AFM image processing). As can be seen in FIG. 34, for the nodules of the compositions I60 to I63 according to the invention, a reduced number-average diameter $\phi_m$ and a very low standard deviation a (this standard deviation being minimal for around 15 parts of resin per 100 parts by weight of COPE) are obtained.

TABLE 19

| compositions of the invention | Parts of epoxy resin per 100 parts of COPE | Average diameter of the nodules (μm) | standard deviation |
|---|---|---|---|
| I60 | 1.05 | 0.357 | 0.369 |
| I61 | 10.46 | 0.249 | 0.163 |
| I62 | 15.68 | 0.205 | 0.119 |
| I63 | 26.14 | 0.271 | 0.294 |

As regards the average shear rate γ used in this example, it was around $1000\ s^{-1}$.

It will be noted, in conclusion, that the compositions according to the present invention are not limited to the examples presented above, and may be based on any other thermoplastic materials reinforced via in situ grafting with at least one epoxy resin, a polyorganosiloxane having SiH functional group(s) or a diisocyanate or polyisocyanate, as long as a reactive compounding of these materials is carried out with a shear rate greater than $10^2\ s^{-1}$ and preferably greater than or equal to $10^3\ s^{-1}$. More specifically, in reference to all of the examples above, there is always, on certain sections of the extrusion screw profiles, maximum shear rates of greater than $580\ s^{-1}$ and which may reach up to $3140\ s^{-1}$.

What is claimed is:

1. A reactive thermoplastic composition that can be used to form a reactive system selected from the group consisting of interphase compatibilizing systems, systems for sizing fibers in composites and systems for dispersing fillers in thermoplastic phases, the composition comprising a continuous phase which is based on at least one thermoplastic polymer and dispersed in which is a discontinuous phase based on at least one reactive reinforcing chemical agent selected from the group consisting of epoxy resins, polyorganosiloxanes having SiH functional group(s), polyisocyanates and mixtures thereof, wherein this composition is free of any compatibilizing agent between said phases and comprises the product of an in situ reaction of grafting, branching and/or crosslinking, by a reactive compounding of these phases under a shear rate greater than $10^3\ s^{-1}$, of said at least one reinforcing agent onto the chain of said at least one thermoplastic polymer, so that the latter has (have), by this reaction, a grafted, branched and/or crosslinked structure, said discontinuous phase being dispersed in said continuous phase in the form of nodules having a number-average size of less than 5 μm with a maximum standard deviation of 0.5 μm.

2. The composition as claimed in claim 1, wherein said at least one reactive reinforcing chemical agent comprises a crosslinked or non-crosslinked epoxy resin in an amount between 0.5 and 60 parts by weight per 100 parts of thermoplastic polymer(s), this epoxy resin being selected from the group consisting of bisphenol A epoxy resins, bisphenol F epoxy resins, glycol epoxy resins, brominated epoxy resins, novolac epoxy resins, phenolic epoxy resins, epoxy resins based on vinyl and/or glycidyl ether, monomers, oligomers and block polymers of these resins and mixtures thereof.

3. The composition as claimed in claim 2, wherein it is free of any crosslinking system for said epoxy resin, which epoxy resin reacts in situ radically with said at least one thermoplastic polymer like a terminating agent.

4. The composition as claimed in claim 1, wherein said at least one reactive reinforcing chemical agent comprises:
   a polyorganosiloxane having SiH functional groups along the chain or at the chain ends, in an amount between 0.1 and 40 parts by weight per 100 parts of thermoplastic polymer(s); or
   a polyisocyanate in an amount between 0.5 and 30 parts by weight per 100 parts of thermoplastic polymer(s), this polyisocyanate being selected from the group consisting of diphenylmethane-4,4'-diisocyanate (MDI), toluene-2,4-diisocyanate (TDI), hexamethylene-1,6-diisocyanate (HDI), polymethylene polyphenyl polyisocyanate (PMPPI) and mixtures thereof.

5. The composition as claimed in claim 1, wherein:
   said continuous phase is based on at least one polyether-block-amide (PEBA), said discontinuous phase being based on at least one epoxy resin; or
   said continuous phase is based on a thermoplastic polyurethane (TPU), said discontinuous phase being based on;
      at least one polyorganosiloxane having SiH functional group(s), or on
      a polyisocyanate; or else
   said continuous phase is based on a mixture of at least one polyether-block-amide (PEBA) and of a thermoplastic polyurethane (TPU), said discontinuous phase being based either on;
      at least one epoxy resin optionally including an amine crosslinking system, or on
      a polyisocyanate; or else wherein
   said continuous phase is based on a polyamide, said discontinuous phase being based on at least one epoxy resin optionally including an amide crosslinking system.

* * * * *

UNITED STATES PATENT AND TRADEMARK OFFICE
CERTIFICATE OF CORRECTION

PATENT NO.        : 9,605,115 B2          Page 1 of 1
APPLICATION NO.   : 14/245065
DATED             : March 28, 2017
INVENTOR(S)       : Garois et al.

It is certified that error appears in the above-identified patent and that said Letters Patent is hereby corrected as shown below:

In the Claims

Column 28,
Line 35, "Sill" should read --SiH--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*